(12) United States Patent
Tranchina et al.

(10) Patent No.: US 9,987,999 B2
(45) Date of Patent: Jun. 5, 2018

(54) VEHICLE ENTERTAINMENT SYSTEM AND METHOD OF MOUNTING VEHICLE ENTERTAINMENT UNIT

(71) Applicant: VOXX INTERNATIONAL CORPORATION, Hauppauge, NY (US)

(72) Inventors: James R. Tranchina, Dix Hills, NY (US); Patrick M. Lavelle, Sayville, NY (US); Raymond Ford, Pinehurst, NC (US); Mike Morales, Orlando, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 34 days.

(21) Appl. No.: 14/986,081

(22) Filed: Dec. 31, 2015

(65) Prior Publication Data

US 2016/0114736 A1   Apr. 28, 2016

Related U.S. Application Data

(63) Continuation-in-part of application No. 14/605,101, filed on Jan. 26, 2015, now Pat. No. 9,310,842, which
(Continued)

(51) Int. Cl.
*H04N 5/64* (2006.01)
*B60R 11/02* (2006.01)
(Continued)

(52) U.S. Cl.
CPC ........ *B60R 11/0235* (2013.01); *B60N 2/4876* (2013.01); *B60R 11/0252* (2013.01);
(Continued)

(58) Field of Classification Search
None
See application file for complete search history.

(56) References Cited

U.S. PATENT DOCUMENTS

| 7,245,274 B2 | 7/2007 | Schedivy |
| 7,636,930 B2 | 12/2009 | Chang |

(Continued)

OTHER PUBLICATIONS

The International Searching Authority dated Mar. 2, 2017 for International Application No. PCT/US2016/067862.
(Continued)

*Primary Examiner* — Heather Jones
(74) *Attorney, Agent, or Firm* — F. Chau & Associates, LLC

(57) ABSTRACT

A vehicle entertainment system includes a cradle disposed in a headrest of a vehicle and having a slot, and a vehicle entertainment unit including a display and a locking mechanism. Upon placing the vehicle entertainment unit in the cradle, the locking mechanism is inserted into the slot to fixedly lock the vehicle entertainment unit in the cradle. Upon fixedly locking the vehicle entertainment unit in the cradle, a space aligned with the locking mechanism is disposed between a first side of the cradle and a first side of the vehicle entertainment unit. The space is shaped and dimensioned to receive a removal tool that contacts the locking mechanism through the space to disengage the locking mechanism from the slot.

15 Claims, 12 Drawing Sheets

Related U.S. Application Data is a continuation of application No. 13/340,946, filed on Dec. 30, 2011, now Pat. No. 8,953,102, which is a continuation-in-part of application No. 12/851,433, filed on Aug. 5, 2010, now Pat. No. 8,713,613, which is a continuation-in-part of application No. 12/570,517, filed on Sep. 30, 2009, now abandoned, which is a continuation-in-part of application No. 11/619,240, filed on Jan. 3, 2007, now abandoned.

(60) Provisional application No. 60/756,070, filed on Jan. 4, 2006.

(51) Int. Cl.
| | | |
|---|---|---|
| *B60N 2/48* | (2006.01) | |
| *G06F 3/147* | (2006.01) | |
| *G06F 1/16* | (2006.01) | |
| *H04B 1/08* | (2006.01) | |
| *H04N 1/00* | (2006.01) | |
| *H04N 7/16* | (2011.01) | |
| *H04N 21/2368* | (2011.01) | |
| *H04N 21/414* | (2011.01) | |
| *H04N 21/434* | (2011.01) | |
| *H04N 21/4363* | (2011.01) | |
| *H04N 21/438* | (2011.01) | |
| *H04N 21/462* | (2011.01) | |
| *H04N 21/61* | (2011.01) | |
| *B60R 11/00* | (2006.01) | |
| *G06F 3/14* | (2006.01) | |

(52) U.S. Cl.
CPC ............ *G06F 1/1633* (2013.01); *G06F 3/147* (2013.01); *H04B 1/082* (2013.01); *H04N 1/00347* (2013.01); *H04N 7/163* (2013.01); *H04N 21/2368* (2013.01); *H04N 21/41422* (2013.01); *H04N 21/4341* (2013.01); *H04N 21/4382* (2013.01); *H04N 21/43637* (2013.01); *H04N 21/4622* (2013.01); *H04N 21/6131* (2013.01); *B60R 2011/0015* (2013.01); *B60R 2011/0017* (2013.01); *B60R 2011/0045* (2013.01); *B60R 2011/0047* (2013.01); *B60R 2011/0075* (2013.01); *B60R 2011/0084* (2013.01); *G06F 3/1423* (2013.01); *G09G 2380/10* (2013.01); *H04N 5/64* (2013.01); *H04N 2201/0041* (2013.01); *H04N 2201/0058* (2013.01); *H04N 2201/0089* (2013.01)

(56) References Cited

U.S. PATENT DOCUMENTS

| | | |
|---|---|---|
| 8,162,395 B2 | 4/2012 | Vitito |
| 2003/0137584 A1 | 7/2003 | Norvell |
| 2004/0092145 A1 | 5/2004 | Sasame et al. |
| 2004/0227372 A1 | 11/2004 | Lavelle et al. |
| 2005/0204596 A1 | 9/2005 | Peng |
| 2007/0164609 A1 | 7/2007 | Shalam et al. |
| 2007/0199028 A1 | 8/2007 | Yau |
| 2008/0157574 A1 | 7/2008 | LaRussa |
| 2009/0115233 A1 | 5/2009 | Tuccinardi et al. |
| 2010/0067884 A1 | 3/2010 | Schedivy |
| 2011/0049943 A1* | 3/2011 | Liu ..................... B60N 2/4876 297/188.04 |
| 2011/0131358 A1 | 6/2011 | Ganesh et al. |
| 2011/0134601 A1 | 6/2011 | Sa |
| 2011/0267759 A1 | 11/2011 | Abram et al. |
| 2015/0131226 A1 | 5/2015 | Tranchina et al. |

OTHER PUBLICATIONS

Office Action dated Mar. 28, 2014 for U.S. Appl. No. 13/586,418.
Written Opinion dated Mar. 8, 2013 for International Appln. No. PCT/US12/70883.
International Search Report dated Mar. 8, 2013 corresponding to PCT/US12/70883.
Office Action for U.S. Appl. No. 15/661,587 dated Sep. 22, 2017.

\* cited by examiner

VEHICLE ENTERTAINMENT SYSTEM AND METHOD OF MOUNTING VEHICLE ENTERTAINMENT UNIT

CROSS-REFERENCE TO RELATED APPLICATIONS

This application is a Continuation-in-Part application of U.S. application Ser. No. 14/605,101, filed on Jan. 26, 2015, which is a Continuation application of U.S. application Ser. No. 13/340,946, filed on Dec. 30, 2011, which is a Continuation-in-Part application of U.S. application Ser. No. 12/851,433, filed on Aug. 5, 2010, which is a Continuation-in-Part application of U.S. application Ser. No. 12/570,517, filed on Sep. 30, 2009, which is a Continuation-in-Part application of U.S. application Ser. No. 11/619,240, filed on Jan. 3, 2007, which claims priority to and the benefit of Provisional Application Ser. No. 60/756,070, filed on Jan. 4, 2006, the contents of which are herein incorporated by reference in their entirety.

TECHNICAL FIELD

The present disclosure relates to a vehicle entertainment system including a vehicle entertainment unit, and a method of mounting a vehicle entertainment unit in a cradle in a vehicle.

DISCUSSION OF RELATED ART

As society becomes more mobile and therefore spends a greater amount of time traveling and away from home, demand rises for electronic devices outside the home environment. For example, vehicle entertainment units including video screens have been mounted in cradles in the headrests of vehicles, facilitating video entertainment on the road. Some vehicle entertainment units may be mounted and unmounted from a corresponding cradle, allowing a user to swap and replace vehicle entertainment units as needed.

BRIEF SUMMARY

According to an exemplary embodiment of the present disclosure, a vehicle entertainment system includes a cradle disposed in a headrest of a vehicle and a vehicle entertainment unit. The cradle includes a first slot disposed near a first side of the cradle and a second slot disposed near a second side of the cradle. The first and second sides of the cradle oppose each other. The vehicle entertainment unit includes a display, a first locking mechanism disposed near a first side of the vehicle entertainment unit, and a second locking mechanism disposed near a second side of the vehicle entertainment unit. The first and second sides of the vehicle entertainment unit oppose each other. Upon placing the vehicle entertainment unit in the cradle, the first side of the vehicle entertainment unit is adjacent to the first side of the cradle and the second side of the vehicle entertainment unit is adjacent to the second side of the cradle. Upon placing the vehicle entertainment unit in the cradle, the first locking mechanism is inserted into the first slot and the second locking mechanism is inserted into the second slot to fixedly lock the vehicle entertainment unit in the cradle. Upon fixedly locking the vehicle entertainment unit in the cradle, a first space aligned with the first locking mechanism is disposed between the first side of the cradle and the first side of the vehicle entertainment unit and a second space aligned with the second locking mechanism is disposed between the second side of the cradle and the second side of the vehicle entertainment unit. The vehicle entertainment system further includes a first removal tool shaped and dimensioned to be inserted into the first and second spaces to disengage the first and second locking mechanisms from the first and second slots. The vehicle entertainment unit is unlocked from the cradle upon inserting the first removal tool into the first space to disengage the first locking mechanism from the first slot and upon inserting the removal tool into the second space to disengage the second locking mechanism from the second slot.

According to an exemplary embodiment of the present disclosure, a vehicle entertainment system includes a cradle disposed in a headrest of a vehicle and including a first slot, and a vehicle entertainment unit including a display and a first locking mechanism. Upon placing the vehicle entertainment unit in the cradle, the first locking mechanism is inserted into the first slot to fixedly lock the vehicle entertainment unit in the cradle. Upon fixedly locking the vehicle entertainment unit in the cradle, a first space aligned with the first locking mechanism is disposed between a first side of the cradle and a first side of the vehicle entertainment unit. The first space is shaped and dimensioned to receive a removal tool that contacts the first locking mechanism through the first space to disengage the first locking mechanism from the first slot.

According to an exemplary embodiment of the present disclosure, a method of mounting a vehicle entertainment unit in a cradle includes placing the vehicle entertainment unit in the cradle. The cradle is disposed in a headrest of a vehicle, and the cradle includes a first slot disposed near a first side of the cradle and a second slot disposed near a second side of the cradle. The first and second sides of the cradle oppose each other. The vehicle entertainment unit includes a display, a first locking mechanism disposed near a first side of the vehicle entertainment unit, and a second locking mechanism disposed near a second side of the vehicle entertainment unit. The first and second sides of the vehicle entertainment unit oppose each other. Upon placing the vehicle entertainment unit in the cradle, the first side of the vehicle entertainment unit is adjacent to the first side of the cradle, the second side of the vehicle entertainment unit is adjacent to the second side of the cradle, the first locking mechanism is inserted into the first slot, and the second locking mechanism is inserted into the second slot. The method further includes sliding the vehicle entertainment unit in a first direction within the cradle to fixedly lock the first locking mechanism within the first slot and the second locking mechanism within the second slot to fixedly lock the vehicle entertainment unit in the cradle.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

Exemplary embodiments of the present disclosure relate to a vehicle entertainment tablet unit for a vehicle, a vehicle system including a vehicle entertainment unit, and a method of mounting a vehicle entertainment unit in a cradle in a vehicle. For example, the vehicle entertainment tablet unit/vehicle entertainment unit may include a display screen mounted in a vehicle, such as an automobile, minivan or sport utility vehicle (SUV). The vehicle entertainment tablet unit/vehicle entertainment unit may receive an Internet connection, provide a wireless connection to wireless enabled devices in and around the vehicle, and transmit and receive multimedia content from wireless enabled devices in and around the vehicle.

Figure 1A:
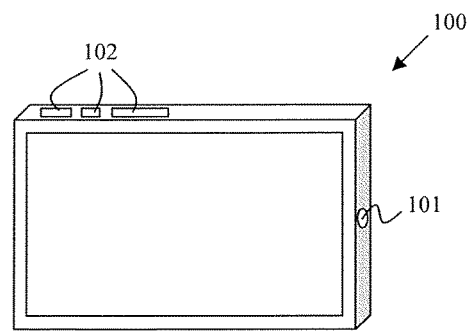
FIG. 1A shows a front view of a vehicle entertainment tablet unit, according to an exemplary embodiment of the present disclosure.
Figure 1B:
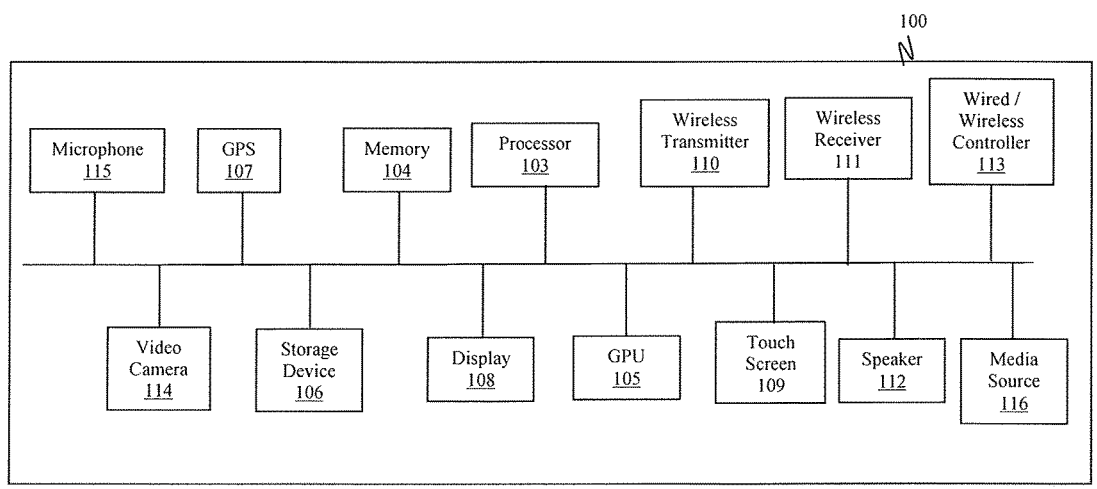
FIG. 1B is a block diagram showing the components of a vehicle entertainment tablet unit, according to an exemplary embodiment of the present disclosure.

FIG. 1A shows a front view of a vehicle entertainment tablet unit, according to an exemplary embodiment. FIG. 1B is a block diagram showing the components of the vehicle entertainment tablet unit, according to an exemplary embodiment.

Referring to FIG. 1A, a vehicle entertainment tablet unit 100 may include at least one control button 101 and a variety of connection ports 102. The control button(s) 101 and the connection ports 102 may be disposed at any location on the vehicle entertainment tablet unit 100. For example, the control button(s) 101 and connection ports 102 may be disposed on a side of the unit 100, on a front surface of the unit 100, or on a back surface of the unit 100. At least one of the control buttons 101 may also be embodied as a switch, or any other physical device capable of passing input to the vehicle entertainment tablet unit 100. The vehicle entertainment tablet unit 100 may be controlled using a combination of the control button(s) 101 and a touch screen input device. The control button(s) 101 may function as an on/off switch, and/or may be used to perform a variety of other functions on the vehicle entertainment tablet unit 100 such as, for example, accessing a menu on the unit 100, waking the unit 100, or turning off the display on the unit 100. The connection ports 102 may include, but are not limited to, a USB port (e.g., a microUSB port or a mini-USB port), an HDMI port (e.g., a micro-HDMI port), an SD card slot (e.g., a micro-SD card slot, a mini-SD card slot, or a standard SD card slot), and/or an Ethernet port. The vehicle entertainment tablet unit 100 may further include a battery supplying power to the unit 100. In an exemplary embodiment, the vehicle entertainment tablet unit 100 may function as a media player capable of presenting video and/or audio programs to a user. In an exemplary embodiment, the vehicle entertainment tablet unit 100 may include additional features, functions, and options.

Referring to FIG. 1B, the vehicle entertainment tablet unit 100 may include, for example, a processor 103 (e.g., a single core or multi-core processor), a memory 104 (e.g., RAM), a graphics processing unit (GPU) 105, a storage device 106 (e.g., flash memory), a global positioning system (GPS) radio 107, a display 108, a touch screen input device 109, a wireless transmitter 110, a wireless receiver 111, and/or a speaker 112. The display 108 may be, for example, a TFT-LCD display, and may be a variety of sizes (e.g., between about 5 inches and about 15 inches). The touch screen input device 109 is an electronic visual display that allows for the detection of touches within a display area. The location of the touch screen input device 109 corresponds to the location of the display 108 on the vehicle entertainment tablet unit 100, and may be used to detect touches made by, for example, a finger, a hand, or a stylus. The touch screen input device 109 may be, for example, a capacitive touch screen panel or a resistive touch screen panel, however the touch screen input device 109 is not limited thereto. The touch screen input device 109 may be used to present a variety of input means to a user to allow the user to enter input to the vehicle entertainment tablet unit 100. For example, software on the vehicle entertainment tablet unit 100 may be used to present a virtual keyboard or keypad to a user, allowing for the input of text and numbers, and/or may accept touch gestures that perform various functions on the unit 100. The unit 100 may run various operating systems such as, for example, the Android™ operating system. The wireless transmitter 110 and receiver 111 may utilize a variety of wireless transmission standards including, but not limited to, cellular, BLUETOOTH, radio frequency (RF), infrared (IR), or 802.11 (e.g., 802.11 a/b/g/n) transmission standards. The vehicle entertainment tablet unit 100 may include multiple wireless receivers and transmitters, which allows the unit 100 to utilize a variety of wireless transmission standards.

Wireless enabled devices may include, but are not limited to, a cellular phone (e.g., a smartphone), a tablet computer, a laptop, an mp3 player, a gaming system, or a personal digital assistant (PDA).

The vehicle entertainment tablet unit 100 may be positioned in any number of locations in a vehicle. For example, the vehicle entertainment tablet unit 100 may be mounted to a seat in a vehicle, within a headrest of a seat in a vehicle, positioned overhead in a vehicle, mounted in the dashboard or center console of a vehicle, or in any other convenient location of a vehicle. The unit 100 may be detachably or fixedly mounted at any of these locations. The mounting of the vehicle entertainment tablet unit 100 is described in more detail below with reference to FIGS. 2A-2D, 3-4, and 7A-7B.

The vehicle entertainment tablet unit 100 provides functions similar to tablet computers such as, for example, the Apple® iPad®. For example, a user may use the vehicle entertainment tablet unit 100 to access the Internet, view video content such as movies or television shows, or listen to audio content such as music or podcasts. Depending on the operating system installed on the vehicle entertainment unit 100, a user may also have access to an application store such as, for example, the Android™ Market, allowing the user to utilize a variety of applications on the vehicle entertainment tablet unit 100.

In an exemplary embodiment, the vehicle entertainment tablet unit 100 may function as a hotspot. For example, the vehicle entertainment tablet unit 100 may establish an Internet connection using the wireless receiver 111 via a Third Generation (3G) or Fourth Generation (4G) cellular network such as, for example, a High Speed Packet Access (HSPA) network, an Evolved High-Speed Packet Access (HSPA+) network, a Long Term Evolution (LTE) network, or a Worldwide Interoperability for Microwave Access (Wi-MAX) network. The Internet connection established by the wireless receiver 111 may then be shared with the wireless transmitter 110, which may assign an Internet Protocol (IP) address to each of the wireless enabled devices in and around the vehicle. The IP addresses may be assigned to the wireless enabled devices using, for example, an 802.11 transmission standard (e.g., 802.11 a/b/g/n). The assignment of IP addresses to the wireless enabled devices by the wireless transmitter 110 allows the vehicle entertainment tablet unit 100 to function as a hotspot by creating an Internet-enabled wireless local area network (e.g., a Wi-Fi network) in and around the vehicle.

Exemplary embodiments may include a single wireless receiver 111 or multiple wireless receivers, which enables the connection to various types of cellular networks (e.g., a first wireless receiver may connect to a 3G network and a second wireless receiver may connect to a 4G network). Further, exemplary embodiments may include a single wireless transmitter 110 or multiple wireless transmitters. Multiple wireless transmitters may be utilized to provide separate wireless local area networks. The utilization of separate wireless local area networks allows for a greater coverage area of the hotspot. For example, larger vehicles such as, for example, buses, trains and airplanes may implement additional wireless transmitters to expand the coverage area of a hotspot. Providing separate wireless local area networks also results in the availability of additional bandwidth which can be used to provide Internet access to a large number of wireless enabled devices. Further, separate wireless local area networks may be utilized to offer connections of varying security/access levels for different groups of users.

Figure 9:
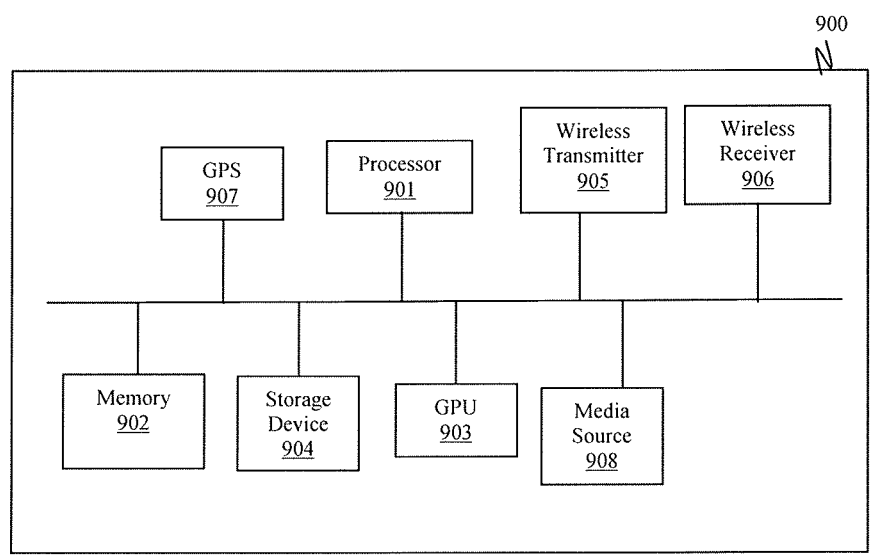
FIG. 9 is a block diagram showing the components of a media control box, according to an exemplary embodiment of the present disclosure.

The inclusion of the wireless receiver 111 and the ability of the vehicle entertainment tablet unit 100 to be mounted in a cradle in a vehicle allows the unit 100 to function as a stand-alone vehicle entertainment device. For example, in an exemplary embodiment, the vehicle entertainment tablet unit 100 receives media content using the wireless receiver 111 via a wireless network (e.g., a cellular network), and displays the received media content without interfacing with any other devices in the vehicle. Alternatively, in an exemplary embodiment, the vehicle entertainment tablet unit may receive media content via a media box disposed within the vehicle, as discussed with reference to FIG. 9.

The wireless local area network provided by the wireless transmitter 110 may utilize an 802.11 transmission standard (e.g., 802.11 a/b/g/n). Various security techniques may be utilized to provide a secure wireless local area network. For example, the wireless local area network may implement Wired Equivalent Privacy (WEP) security, Wi-Fi Protected Access (WPA, WPA2) security, MAC address filtering, port filtering, and the ability to disable Service Set Identifier (SSID) broadcasting. These security settings can be accessed by a user via a user interface, which may be accessible via the display 108 of the vehicle entertainment tablet unit 100, or a wireless enabled device connected to the wireless local area network.

In an exemplary embodiment, the vehicle entertainment tablet 100 unit may receive an Internet connection via another device functioning as a hotspot.

The vehicle entertainment tablet unit may include at least one speaker 112 for outputting audio. Additional speaker(s) may also be located separate from the vehicle entertainment tablet unit 100, and may be connected to the unit 100 via an electrical or wireless connection such as, for example, a BLUETOOTH, radio frequency (RF), infrared (IR), or 802.11 (e.g., 802.11 a/b/g/n) wireless connection.

The GPS radio 107 of the vehicle entertainment tablet unit 100 may allow the vehicle entertainment tablet unit 100 to function as a navigation device. For example, the vehicle entertainment tablet unit 100 may provide services such as, for example, location-based searching and turn-by-turn navigation by utilizing the GPS radio 107, a data connection, and software installed on the vehicle entertainment tablet unit 100.

A wired or wireless controller 113 may be used to control the vehicle entertainment tablet unit 100. The controller 113 may control all functions of the vehicle entertainment tablet unit 100 including, for example, multimedia functions and Internet functions. A wireless controller may utilize software installed on the vehicle entertainment tablet unit 100, and may communicate with the vehicle entertainment tablet unit 100 using, for example, BLUETOOTH, radio frequency (RF), infrared (IR), or 802.11 (e.g., 802.11 a/b/g/n) transmission standards. A wired controller may connect to the vehicle entertainment tablet unit 100 via one of the connection ports (e.g., a USB port) on the unit 100.

In an exemplary embodiment, a video camera 114 and/or a microphone 115 may be connected to the vehicle entertainment tablet unit 100. The video camera 114 and/or microphone 115 may be disposed on the vehicle entertainment tablet unit 100 or may be located separate from the unit 100 and connected to the unit 100 via a wired or wireless connection such as, for example, a radio frequency (RF), infrared (IR), BLUETOOTH, or 802.11 (e.g., 802.11 a/b/g/n) connection. The video camera 114 and microphone 115 can be utilized with the speaker(s) 112 under control of the processor 103, and when connected to the Internet, may provide Voice over IP (VOIP) and videoconferencing functionality.

The video camera 114, microphone 115 and/or speaker(s) 112 may be positioned together or separately, and can be positioned in any number of locations in a vehicle. For example, the video camera 114, microphone 115, and/or speaker(s) 112 may be integrated with the vehicle entertainment tablet unit 100 or may be located separate from the unit 100, or may be mounted in a seat, headrest, overhead, dashboard or center console of the vehicle, or in any other convenient location of the vehicle. In addition to videoconferencing functionality, the video camera 114 and microphone 115 may be used to record and store video data in the storage device 106 of the vehicle entertainment tablet unit 100. A video camera 114 disposed in a rear seat may also be utilized by a driver or a passenger in another seat to monitor a child sitting within the field of view of the video camera 114. This monitoring may be done via a vehicle entertainment tablet unit 100 in the vehicle, a display, or a wireless enabled device connected to the local area network.

The wired or wireless controller 113 may be used to control functions of the video camera 114, microphone 115, and/or speaker(s) 112. For example, the controller 113 can be used to enter and exit VOIP or videoconferencing mode, enable the video camera 114, microphone 115, and/or speaker(s) 112, control the volume of the speaker(s) 112, disable the video camera 114, microphone 115, and/or speaker(s) 112, or change recording options of the video camera 114 and/or microphone 115.

In an exemplary embodiment, the vehicle entertainment tablet unit 100 may communicate with a plurality of video cameras, microphones, and/or speakers, and functions of each video camera, microphone, and/or speaker may be controlled by the same controller or a separate controller. The video cameras, microphones, and/or speakers may further be controlled by the wireless enabled devices connected to the wireless local area network using, for example, software installed on the wireless enabled devices.

In an exemplary embodiment, a media source 116 may be connected to the vehicle entertainment tablet unit 100. The media source 116 may be part of the vehicle entertainment tablet unit 100, may be located within a cradle configured to receive the vehicle entertainment tablet unit 100, or may be located separate from the vehicle entertainment tablet unit 100 and the cradle. The media source 116 may be connected via a connection port 102 on the vehicle entertainment tablet unit 100, or wirelessly via, for example, a BLUETOOTH, radio frequency (RF), infrared (IR), or 802.11 (e.g., 802.11 a/b/g/n) connection. The media source 116 may be, for example, a DVD player, a CD-ROM player, a video game player, a videocassette player, a television tuner, a radio tuner, an MP3 player, a digital video recorder (DVR), and/or a device for playing media supplied from a portable storage device (e.g., a portable hard drive, memory cards, flash memory sticks, key drives, thumb drives).

Audio and video signals may be transmitted from the vehicle entertainment tablet unit 100 to other displays and/or speaker(s) located within the vehicle, receivers connected to a vehicle radio, wireless headphones, or wireless enabled devices connected to the wireless local area network. The audio and video signals may be transmitted wirelessly by the wireless transmitter 110 using, for example, radio frequency (RF), infrared (IR), BLUETOOTH, or 802.11 (e.g., 802.11 a/b/g/n) transmission standards.

The vehicle entertainment tablet unit 100 may be detachably or fixedly mounted to a cradle in a vehicle, which may be positioned in a variety of locations within the vehicle. For example, a cradle configured to receive and secure the vehicle entertainment tablet unit 100 may be mounted within a headrest of a seat in a vehicle, within a seat back of a seat in a vehicle, in an overhead position within a vehicle, or in any other convenient location of a vehicle.

FIGS. 2A-2D show a vehicle entertainment unit, and a cradle mounted within a headrest of a seat in a vehicle and configured to receive the vehicle entertainment unit.

Figure 2A:
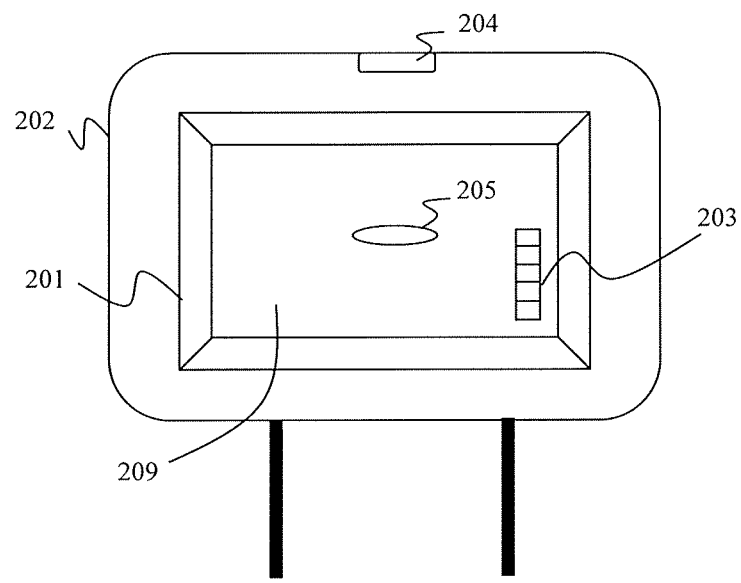
FIGS. 2A-2D show a vehicle entertainment tablet unit, and a cradle mounted within a headrest of a seat in a vehicle and configured to receive the vehicle entertainment tablet unit, according to an exemplary embodiment of the present disclosure.
Figure 8:
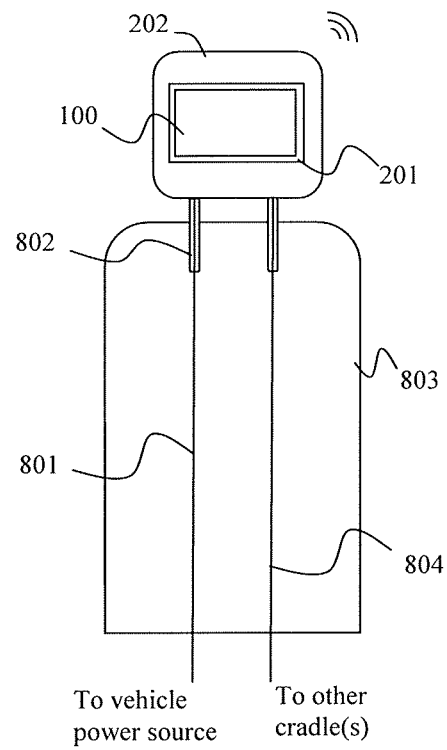
FIG. 8 shows a power wire and a data wire connecting to a cradle in a headrest in a vehicle, according to an exemplary embodiment of the present disclosure.

FIG. 2A shows a cradle 201 disposed in a headrest 202 of a seat in a vehicle, and shaped and dimensioned to receive the vehicle entertainment tablet unit 100, according to an exemplary embodiment. The cradle 201 may include an electrical connection 203 that can be used to electrically couple the vehicle entertainment tablet unit 100 to the cradle 201. The electrical connection 203 may be, for example, a plurality of electrical contacts or a pin connector. The cradle 201 may be electrically connected to a power source in the vehicle, and the electrical connection 203 in the cradle 201 may be utilized to supply power to the vehicle entertainment tablet unit 100 when docked. For example, as shown in FIG. 8, the cradle 201 may be connected to a vehicle power source via a power wire(s) 801 connecting to the electrical connection 203 in the cradle 201 and passing through a headrest post 802 and the seat 803. The power wire(s) 801 may pass through a single headrest post 802 or multiple headrest posts 802. When multiple cradles are present in a vehicle, a data wire(s) 804 may connect the electrical connections in the cradles to each other, and may facilitate the transmission of data between docked vehicle entertainment tablet units. The data wire(s) 804 may pass through a single headrest post 802 of the same seat 803 or multiple headrest posts 802 of the same seat 803.

Figure 2B:
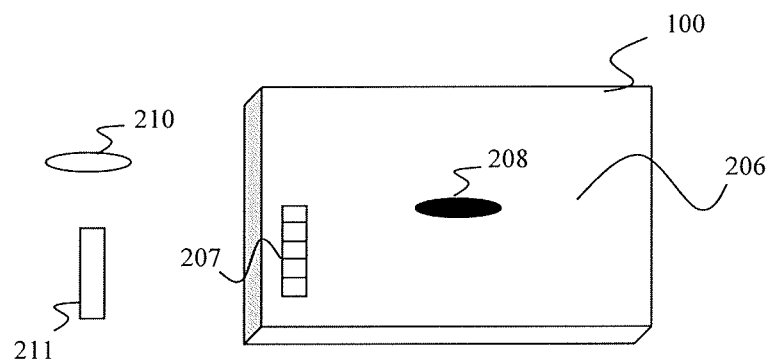

The cradle 201 may further include a hinge mechanism allowing the vehicle entertainment tablet unit 100 to be pivoted in vertical and/or horizontal directions, and a mounting mechanism configured to allow the vehicle entertainment tablet unit 100 to be detachably removed from the cradle 201 in an exemplary embodiment. The hinge mechanism is described in more detail with reference to FIG. 4. The mounting mechanism may be, for example, a quick release mount mechanism, and may utilize a variety of selectively releasable coupling structures. For example, as shown in FIGS. 2A and 2B, the mounting mechanism may include a release button 204 disposed on a surface of the headrest 202 and a latch member 205 disposed on a rear surface 209 of the cradle 201. The release button 204 is actuated to rotate the latch member 205 and permit removal of the vehicle entertainment tablet unit 100 from the cradle 201. Insertion of the vehicle entertainment tablet unit 100 within the headrest 202 is achieved by setting the vehicle entertainment tablet unit 100 within the cradle 201 and applying sufficient force to the vehicle entertainment tablet unit 100 for overcoming the rotational force of the latch member 205 to force the vehicle entertainment tablet unit 100 into a secure position.

FIG. 2B shows a rear surface 206 of the vehicle entertainment tablet unit 100, which is configured to be mounted within the cradle 201 shown in FIG. 2A, according to an exemplary embodiment. In FIG. 2B, the vehicle entertainment tablet unit 100 includes a cooperating electrical connection 207 configured to be electrically coupled to the electrical connection 203 of the cradle 201, and a cooperating mounting mechanism 208 configured to be coupled to the latch member 205 of the cradle 201. In an exemplary embodiment, optional covers 210, 211 may be included to cover the cooperating electrical connection 207 and the mounting mechanism 208 of the vehicle entertainment tablet unit 100 when the unit 100 is not coupled to the cradle.

Figure 2C:
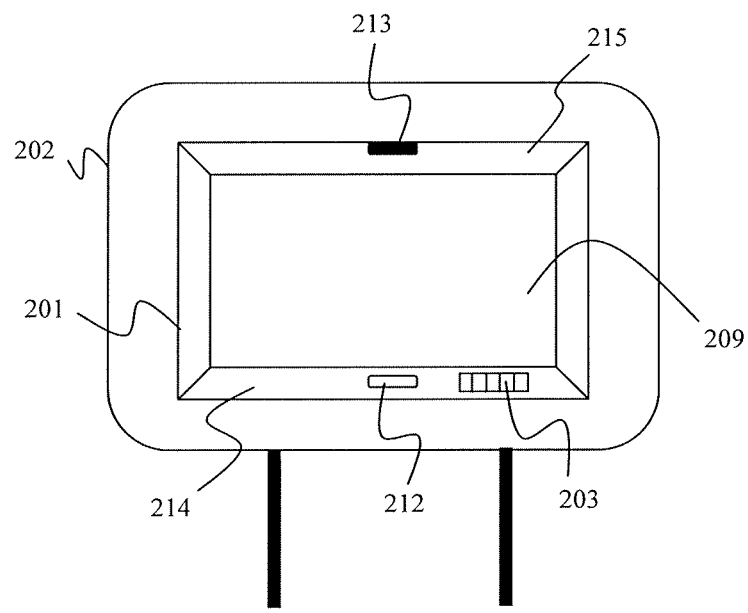

In an exemplary embodiment, the mounting mechanism on the cradle 201 may include a recess 212 and a latch member 213, as shown in FIG. 2C. The recess 212 and latch member 213 may have a variety of shapes, and may be disposed on the cradle 201 in a variety of locations. For example, in the exemplary embodiment shown in FIG. 2C, the recess 212 is disposed on a first lip 214 of the cradle 201 and the latch member 213 is disposed on a second lip 215 of the cradle, which opposes the first lip 214. The electrical connection 203 of the cradle is disposed on the first lip 214. A depth of the cradle 201 may be defined by the distance between the rear surface 209 of the cradle 201 and the outermost portion of the lips 214, 215 of the cradle 201. Due to the thinness of the vehicle entertainment tablet unit 100, the depth of the cradle 201 may be between about 0.25 inches and about 0.6 inches, however the depth is not limited thereto. The mounting mechanism on the vehicle entertainment tablet unit 100 may include a tab 216 disposed on a first edge 217 of the unit 100 and a coupling member (not shown) disposed on a second edge (not shown) of the unit 100, which opposes the first edge 217. Upon mounting the vehicle entertainment tablet unit 100 into the cradle 201, the tab 216 is inserted into the recess 212, and the coupling member on the second edge of the vehicle entertainment tablet unit 100 engages the latch member 213 of the cradle 201, locking the unit 100 into place. The electrical connection 207 of the unit 100 is electrically coupled to the electrical connection 203 of the cradle 201 upon mounting. The vehicle entertainment tablet unit 100 may be fixedly or removably mounted to the cradle 201. When the unit 100 is removably mounted, a portion of the latch member 213 on the cradle 201 may be exposed, allowing a user to remove the unit 100 from the cradle 201 by actuating the latch member 213. When mounted, the vehicle entertainment tablet unit 100 may be substantially flush with the outer surface of the headrest 202.

Figure 2D:
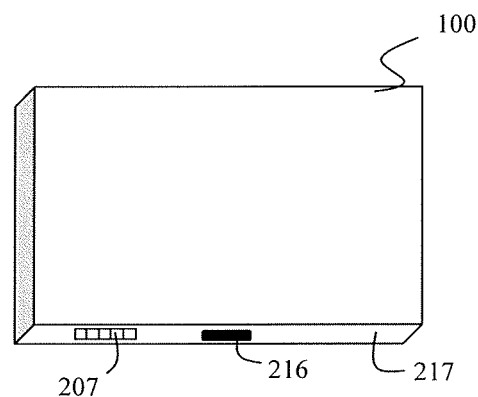

The mounting mechanisms and electrical connections shown in FIGS. 2A-2D may be disposed in a variety of locations. For example, in FIGS. 2A-2B, the release button 204 may be disposed in any area of the headrest 202, the latch member 205 and electrical connection 203 may be disposed in any area of the rear surface 209 of the cradle 201, and the cooperating mounting mechanism 208 and electrical connection 207 of the vehicle entertainment tablet unit 100 may be disposed in any corresponding area of the rear surface 206 of the unit 100. In FIGS. 2C-2D, the recess 212 and electrical connection 203 may be disposed in any area of any lip of the cradle 201, the latch member 213 may be disposed in any area of an opposing lip of the cradle 201, the tab 216 and electrical connection 207 of the vehicle entertainment tablet unit 100 may be disposed in any corresponding area of any edge of the unit 100, and the coupling member (not shown) of the unit 100 may be disposed on an opposing edge of the unit 100. Alternatively, the electrical connection 203 may be disposed on the same lip as the latch member 213, and the electrical connection 207 may be disposed on the same edge as the coupling member (not shown).

Figure 3:
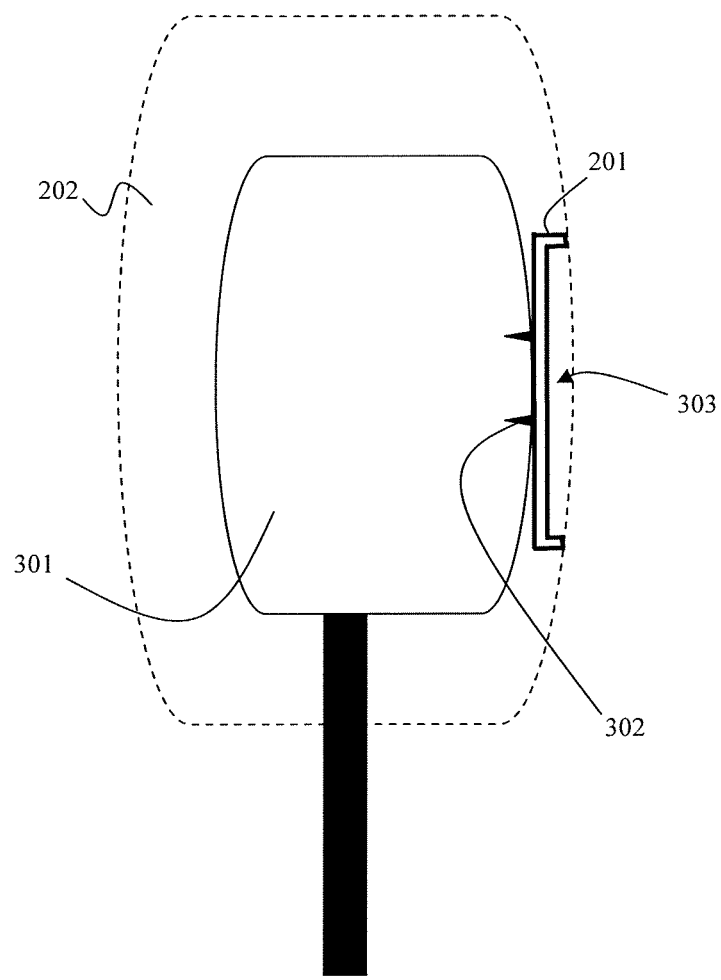
FIG. 3 is a side view showing a cradle mounted to a headrest in a vehicle, according to an exemplary embodiment of the present disclosure.

FIG. 3 is a side view showing a cradle mounted within a headrest.

As shown in FIG. 3, the cradle 201 is secured to the headrest 202. In an exemplary embodiment, the cradle 201 may be secured to an internal headrest support structure 301 of the headrest 202 using, for example, a fastener 302, screw, nail, or adhesive, however the method of securing the cradle 201 to the headrest 202 is not limited thereto. The cradle 201 includes a receiving portion 303 shaped and dimensioned to receive the vehicle entertainment tablet unit 100. Due to the thinness of the vehicle entertainment tablet unit 100, the depth of the receiving portion 303 may be between about 0.25 inches and about 0.6 inches, however the depth is not limited thereto.

Figure 4:
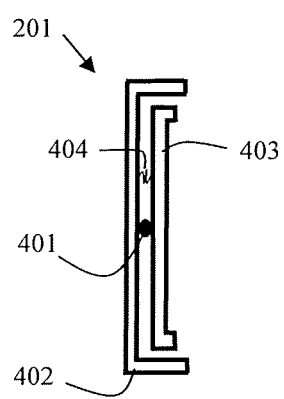
FIG. 4 is a side view of a cradle including a hinge mechanism, according to an exemplary embodiment of the present disclosure.

In an exemplary embodiment, the cradle 201 may include a hinge mechanism 401 that permits the vehicle entertainment tablet unit 100 to be pivoted in vertical and/or horizontal directions, as shown in FIG. 4. For example, in the exemplary embodiment shown in FIG. 4, the cradle 201 includes a base portion 402, a receiving portion 403, and a hinge mechanism 401 connecting the receiving portion 403 to the base portion 402. The base portion 402 may be secured to an internal headrest support structure 301 of a headrest 202 as described with reference to FIG. 3, and the vehicle entertainment tablet unit 100 may be secured into the receiving portion 403 as described with reference to FIGS. 2A-2D (e.g., the receiving portion 403 may include an electrical connection 203 and a mounting mechanism such as latch members 205 and 213 and/or recess 212). The receiving portion 403 may be electrically connected to the base portion 402 via a wire 404 connecting the two portions. The hinge mechanism 401 permits the receiving portion 403 to pivot with respect to the base portion 402 in horizontal and/or vertical directions, allowing for the adjustment of the viewing angle of the vehicle entertainment tablet unit 100 when mounted. The hinge mechanism 401 may be a ball-like mechanism located near the center of the cradle 201 and permitting the receiving portion 403 to pivot about a number of axes, as shown in FIG. 4, however the shape and location of the hinge mechanism 401 is not limited thereto.

Figure 5:
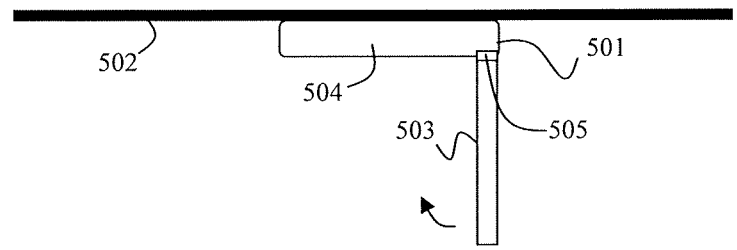
FIG. 5 shows a cradle mounted in an overhead position in a vehicle and configured to receive a vehicle entertainment tablet unit, according to an exemplary embodiment of the present disclosure.

FIG. 5 shows a cradle 501 disposed in an overhead position and configured to receive the vehicle entertainment tablet unit 100, according to an exemplary embodiment. The cradle 501 is attached to the ceiling 502 of a vehicle. The cradle 501 may be recessed within the ceiling 502, or may extend below the ceiling 502, as shown in FIG. 5. Due to the thinness of the vehicle entertainment tablet unit 100, the cradle 501 may have a thin profile. For example, the cradle 501 may have a thickness between about 0.25 inches and about 0.6 inches, however the thickness is not limited thereto. The cradle 501 may include a receiving portion 503 configured to detachably or fixedly receive the vehicle entertainment tablet unit 100 in a manner similar to the one described with reference to FIGS. 2A-2D. For example, the receiving portion 503 may include an electrical connection that can be used to electrically couple the vehicle entertainment tablet unit 100 to the receiving portion 503 of the cradle 501. The electrical connection may be, for example, a plurality of electrical contacts or a pin connector. The cradle 501 may further include a hinge mechanism 505 allowing the vehicle entertainment tablet unit 100 to be pivoted into the base portion 504 of the cradle 501 when the vehicle entertainment tablet 100 unit is mounted and not in use. The hinge mechanism 505 may be located in an upper area of the receiving portion 503 of the cradle 501. The receiving portion 503 may include an additional hinge mechanism permitting the vehicle entertainment tablet unit 100 to be pivoted in a vertical and/or horizontal direction, allowing for further adjustment of the viewing angle of the vehicle entertainment tablet unit 100. For example, in an exemplary embodiment, the receiving portion 503 may include the base portion 402, the receiving portion 403, and the hinge mechanism 401 described with reference to FIG. 4. The cradle 501 may further include a mounting mechanism configured to allow the vehicle entertainment tablet unit 100 to be detachably mounted to and removed from the cradle 501. The mounting mechanism may be, for example, a quick release mount mechanism, and may utilize a variety of selectively releasable coupling structures. For example, the mounting mechanisms described with reference to FIGS. 2A-2D may be utilized.

Figure 6:
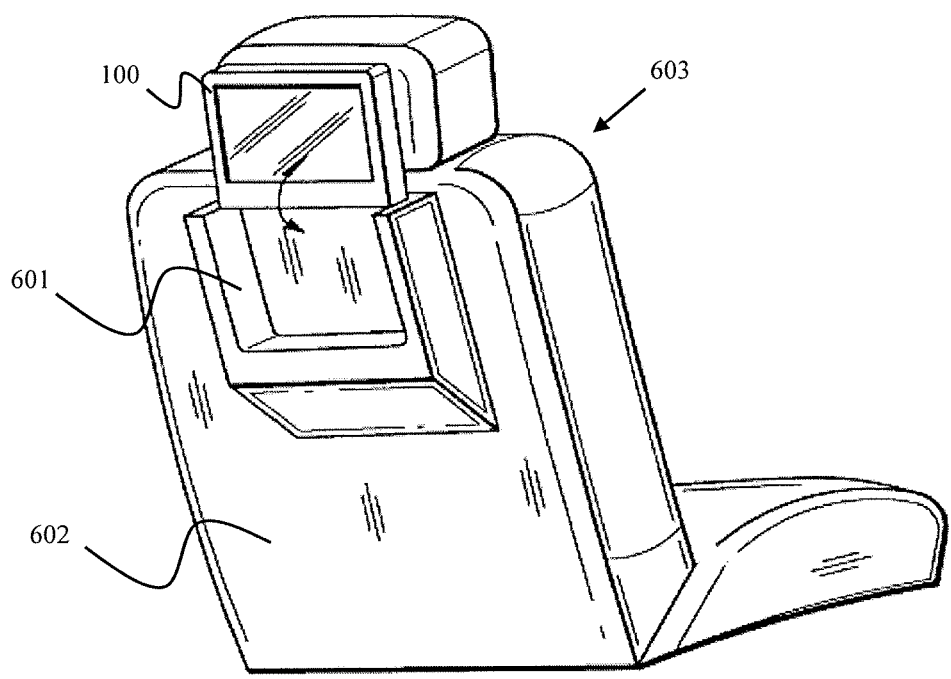
FIG. 6 shows a cradle mounted within a seat back of a seat in a vehicle and configured to receive a vehicle entertainment tablet unit, according to an exemplary embodiment of the present disclosure.

FIG. 6 shows a cradle 601 disposed on a seat back 602 of a seat 603 in a vehicle, and configured to receive the vehicle entertainment tablet unit 100, according to an exemplary embodiment. The vehicle entertainment tablet unit 100 may slide vertically into the cradle 601, or may pivotally attach to the cradle 601 such that it is rotated between a display position and a storage position. The vehicle entertainment tablet unit 100 may be pivotally attached to the cradle 601 using a hinge mechanism operating in a manner similar to the hinge mechanism 505 described with reference to FIG. 5. The cradle 601 may be recessed within the seat back 602, or may extend from the seat back 602, as shown in FIG. 6. In an exemplary embodiment, the cradle 601 may be embedded into a seat mold that is designed to replace the existing backseat mold of a seat in a vehicle. Due to the thin nature of the vehicle entertainment tablet unit 100, the cradle 601 may have a thin profile. For example, the cradle 601 may have a thickness between about 0.25 inches and about 0.6 inches, however the thickness is not limited thereto. The cradle 601 may include an electrical connection and mounting mechanisms similar to those described with reference to FIGS. 2A-2D.

In an exemplary embodiment, the vehicle entertainment tablet unit 100 may function as a multimedia sharing unit. For example, once connected to the wireless local area network, wireless enabled devices may access multimedia data stored on the vehicle entertainment tablet unit 100. This multimedia data may include, for example, movies, television shows, music and pictures, and may include both real-time and non-real-time content. Connected wireless enabled devices may access multimedia data stored in the storage device 106 of the vehicle entertainment tablet unit 100 while the wireless enabled devices are connected to the Internet or while the wireless enabled devices are not connected to the Internet. Connected wireless enabled devices may also transmit and receive data to and from each other while connected to the wireless local area network provided by the vehicle entertainment tablet unit 100.

In an exemplary embodiment, multiple vehicle entertainment tablet units 100 may be mounted in a vehicle. When multiple vehicle entertainment tablet units 100 are present in a vehicle, one of the units 100 may function as a multimedia sharing unit, or multiple vehicle entertainment tablet units 100 may function as multimedia sharing units, allowing media content to be shared freely between all of the units 100, as well as wireless enabled devices present in and around the vehicle. The vehicle entertainment tablet units 100 and the wireless enabled devices may communicate with each other once connected to the same local area network, as described above. In an exemplary embodiment, the vehicle entertainment tablet units 100 and wireless enabled devices may communicate with each other using BLUETOOTH or WI-FI DIRECT transmission standards. WI-FI DIRECT allows the vehicle entertainment tablet units 100 and wireless enabled devices to wirelessly communicate with each other without connecting to a local area network via a hotspot. Displays including a Wi-Fi radio and utilizing WI-FI DIRECT may also be mounted in the vehicle and may communicate with the vehicle entertainment tablet unit(s) 100 and/or wireless enabled devices. The displays may be mounted at the same locations and in the same manner as the vehicle entertainment tablet units 100 as described above.

In an exemplary embodiment, a cradle configured to receive a variety of different tablet units made by different manufacturers may be disposed within a vehicle. For example, the cradle may be a universal cradle configured to receive tablet units such as the Apple® iPad®, or various tablet units running different operating systems such as, for example, the Android™ operating system. The cradle may be disposed in a variety of locations such as, for example, in a seat in a vehicle, within a headrest of a seat in a vehicle, positioned overhead in a vehicle, or mounted in the dashboard or center console of a vehicle. For example, FIG. 7A shows an exemplary embodiment of a cradle mounted in the headrest of a seat in a vehicle, and FIG. 7B shows an exemplary embodiment of a cradle mounted in the back of a seat in a vehicle.

Figure 7A:
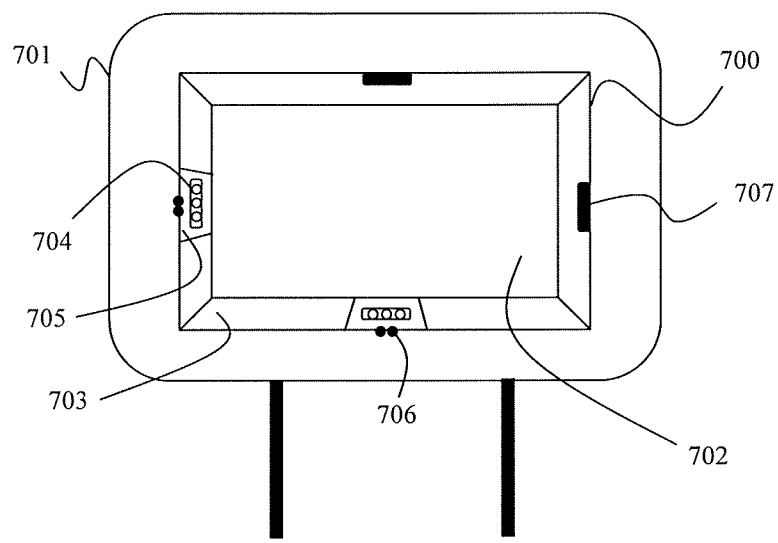
FIG. 7A shows a cradle mounted in a headrest of a seat in a vehicle, according to an exemplary embodiment of the present disclosure.
Figure 7B:
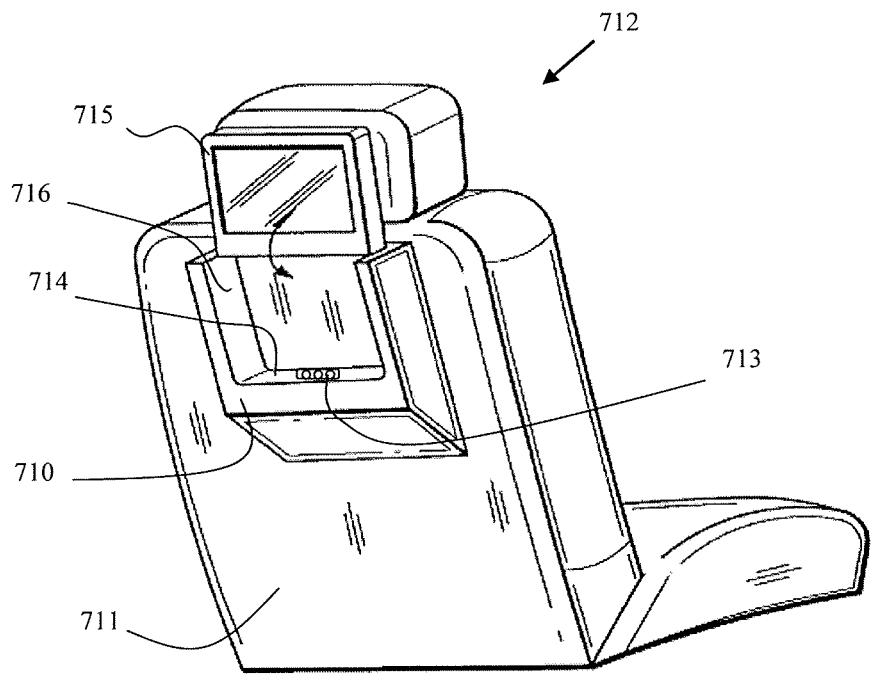
FIG. 7B shows a cradle mounted in the back of a seat in a vehicle, according to an exemplary embodiment of the present disclosure.

Referring to FIG. 7A, a cradle 700 is mounted within a headrest 701 in a vehicle. The cradle 700 includes a rear surface 702 and lips 703 extending outward from the rear surface 701. A depth of the cradle 700 may be defined by the distance between the rear surface 702 and the outermost portion of the lips 703. Due to the thinness of most tablet units, the depth of the cradle 700 may be between about 0.25 inches and about 0.6 inches, however the depth is not limited thereto. A connection port 704 is disposed on a door 705 on a lip 703 of the cradle 700. The connection port 704 is designed to matingly receive a connector of a tablet unit, and may supply power and transmit and receive data to and from the tablet unit, as described above with reference to FIGS. 2A-2D and 8.

In an exemplary embodiment, the cradle 700 may include a single connection port 704. Alternatively, in an exemplary embodiment, multiple connection ports 704 may be disposed on different lips 703 of the cradle 700, as shown in FIG. 7A, allowing the tablet unit to be mounted to the cradle 700 in a landscape orientation or in a portrait orientation, and allowing for the mounting of different tablet units having connectors located in different locations. Each door 705 may be spring-loaded, allowing an unused connection port 704 to be stored beneath the surface of the lip 703 when not in use. For example, pressing a spring-loaded door 705 once may lock the door 705 beneath the surface of a lip 703 when the connection port 704 is not in use, and pressing the door 705 again may unlock the door 705, extending the door 705 from the surface of the lip 703 and allowing for the connection of tablet unit to the connection port 704 via the tablet unit's connector. The connection port 704 may include a variety of connection types adapted to connect to different tablet units such as, for example, a USB port (e.g., a microUSB port or a mini-USB port) or other proprietary connection types such as a 30-pin connector compatible with the Apple® iPad®. The connection port 704 may also be used to matingly receive other mobile devices such as, for example a smartphone.

Each door 705 may include a hinge 706 permitting the door 705 to pivot away from the lip 703 and towards the user. For example, when pivoted away from the lip 703, the door 705 may be substantially parallel to the rear surface 702 of the cradle 700. Pivoting the door 705 away from the lip 703 allows the connector of a tablet unit to be connected to the connection port 704 on the door 705. Once the tablet unit is attached to the cradle via the connection port 704, the door 705 may be pivoted back towards the lip 703, resulting in the tablet unit being disposed within the cradle 700. In an exemplary embodiment, a latch member 707 may be disposed on a lip 703 opposing the connection port 704, and may be utilized to secure the mounted tablet unit in the cradle 700. For example, the latch member 707 may be a door that pivots away from the lip 703 to allow the tablet unit to be accepted into the cradle 700, and towards the lip 703 once the tablet unit is in the cradle 700 to cover a portion of the tablet unit and secure the tablet unit in the cradle 700. The latch member 707 may utilize a hinge similar to the hinge 706 of the door 705 including the connection port 704 to pivot towards and away from the lip 703.

The location of the cradle 700 described with reference to FIG. 7A is not limited to a headrest of a vehicle. For example, the cradle 700 may be positioned overhead in a vehicle (e.g., on the receiving portion 503 of the cradle 501 shown in FIG. 5), in a seat back of a seat in a vehicle, or mounted in the dashboard or center console of a vehicle.

In FIG. 7B, a cradle 710 is disposed on a seat back 711 of a seat 712 in a vehicle, and is configured to receive a variety of tablet units such as, for example, the Apple® iPad®, or various tablet units running different operating systems such as the Android™ operating system. The cradle 710 may include a connection port 713 disposed on a lower lip 714 of the cradle 710. The connection port 713 may include a variety of connection types adapted to connect to different tablet units such as, for example, a USB port (e.g., a microUSB port or a mini-USB port) or other proprietary connection types such as a 30-pin connector compatible with the Apple® iPad®. The connection port 713 may also be used to matingly receive other mobile devices such as, for example a smartphone. A tablet unit 715 may slide vertically into the cradle 710 through an opening opposing the lower lip 714, and a connector on the tablet unit 715 may be coupled to the connection port 713. Side lips 716 disposed adjacent to the lower lip 714 may provide structural support to the tablet unit 715 when the unit 715 is mounted in the cradle 710. The tablet unit 715 may receive power and may transmit and receive data via the connection port 713 as described above in references to FIGS. 2A-2D and 8. In an exemplary embodiment, the cradle 710 may be embedded into a seat mold that is designed to replace the existing backseat mold of the seat 712. Due to the thin nature of most tablet units, the cradle 710 may have a thin profile. For example, the cradle 710 may have a thickness between about 0.25 inches and about 0.6 inches, however the thickness is not limited thereto.

In an exemplary embodiment, a media control box 900 may be mounted within the vehicle and some or all of the vehicle entertainment tablet units 100 may be replaced with displays equipped with a BLUETOOTH radio or a Wi-Fi radio that utilizes WI-FI DIRECT transmission standards. The displays may be mounted at the same locations and in the same manner as the vehicle entertainment tablet units 100 as described above. The media control box 900 may be positioned in any convenient location in the vehicle such as, for example, overhead, under a seat, in a center console, in a dashboard, in a trunk, in a headrest of a seat, or in a seat back of a seat. The media control box 900 may be connected to a power source of the vehicle, and may include, for example, a processor 901 (e.g., a single core or multi-core processor), a memory 902 (e.g., RAM), a graphics processing unit (GPU) 903, a storage device 904 (e.g., flash memory, hard drive), a wireless transmitter 905, a wireless receiver 906, a global positioning system (GPS) radio 907, an internal or external media source 908, and/or a variety of connection ports, as shown in the block diagram in FIG. 9. The connection ports may include, but are not limited to, a USB port (e.g., a microUSB port or a mini-USB port), an HDMI port (e.g., a micro-HDMI port), an SD card slot (e.g., a micro-SD card slot, a mini-SD card slot, or a standard SD card slot), and an Ethernet port. The media control box 900 may communicate with the displays via a wireless connection (e.g., WI-FI Direct, Bluetooth), or may be physically connected to the displays via wires. For example, wires connecting the media control box 900 to the displays may extend from the media control box 900 and through a seat back and headrest posts of a seat to connect to a display, in a manner similar to the power wire(s) 801 and data wires 804 as described with reference to FIG. 8. The media control box 900 may be used to transmit media to any of the displays, or any wireless enabled device in and around the vehicle. In addition, when the vehicle is within the range of a user's home network, the media control box 900 may connect to the home network via Wi-Fi to sync, transmit and/or receive media to and from devices in the user's home. In an exemplary embodiment, rather than being embodied as a stand-alone unit, the media control box 900 may be integrated with a display mounted in the vehicle.

In an exemplary embodiment, the media control box 900 may be permanently mounted within a vehicle. Alternatively, the media control box 900 may be a portable unit that can be moved between vehicles. The portable unit, for example, may mount and electrically connect to a docking station in a vehicle in a manner similar to the mounting of the vehicle entertainment tablet unit 100 into a cradle 201, as described with reference to FIGS. 2A-2D, 5-6, and 7A-7B.

In an exemplary embodiment, software installed on the vehicle tablet unit 100 or display may allow the vehicle entertainment tablet unit 100 or display to communicate with the vehicle head unit and control functions of the vehicle such as, for example, the vehicle's radio, GPS system, and/or air conditioning and heating system. Communication with the vehicle head unit may be carried out via a wired connection or a wireless connection, as described above.

A vehicle entertainment system according to an exemplary embodiment of the present disclosure is described herein with reference to FIGS. 10A to 14B.

Figure 10A:
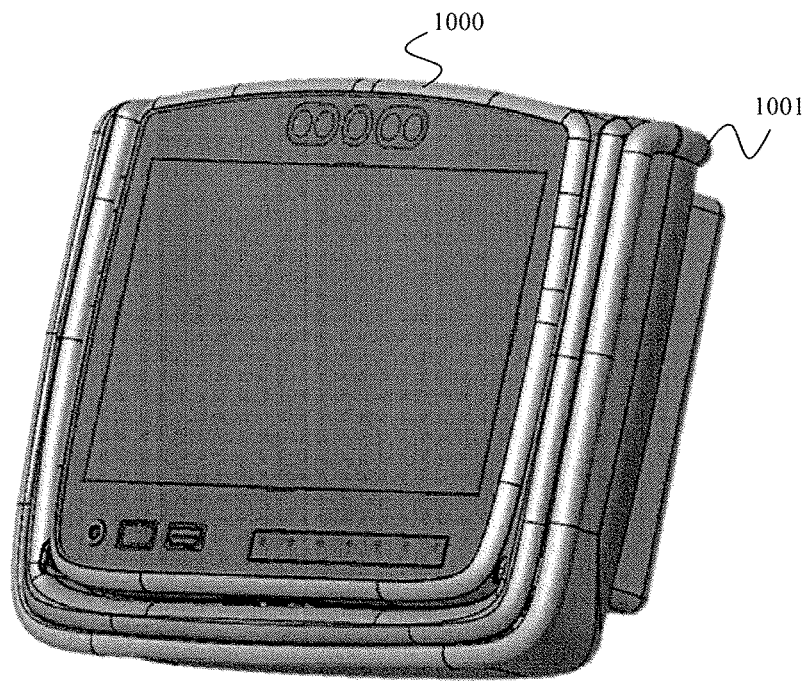
FIG. 10A is a front view of a vehicle entertainment system according to an exemplary embodiment of the present disclosure.
Figure 10B:
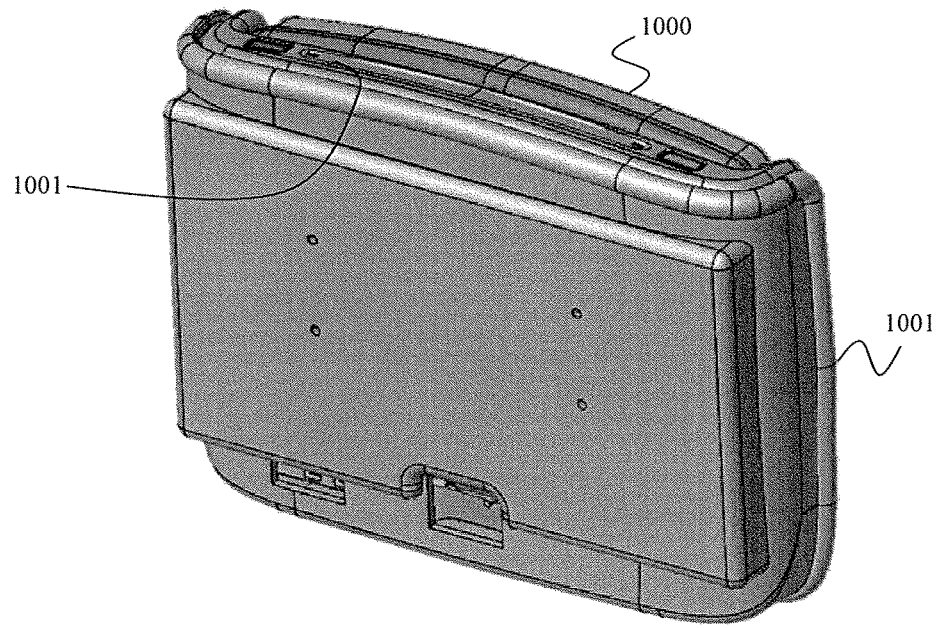
FIG. 10B is a rear view of a vehicle entertainment system according to an exemplary embodiment of the present disclosure.

FIG. 10A is a front view of a vehicle entertainment system according to an exemplary embodiment of the present disclosure. FIG. 10B is a rear view of a vehicle entertainment system according to an exemplary embodiment of the present disclosure.

In the vehicle entertainment system of FIGS. 10A-14B, a cradle 1001 is shaped and dimensioned to receive a vehicle entertainment unit 1000. According to exemplary embodiments, the vehicle entertainment unit 1000 may be the vehicle entertainment tablet unit 100, or the vehicle entertainment unit 1000 may include all, some, or most of the components and/or functionality described above with reference to the vehicle entertainment tablet unit 100. For example, in an exemplary embodiment, the vehicle entertainment unit 1000 may include all of the components and functionality of the vehicle tablet unit 100 described above except that the vehicle entertainment unit 1000 may not be designed for use while it is not docked in the cradle 1001.

In addition, it is to be understood that aspects of the present disclosure described above may be implemented in exemplary embodiments according to FIGS. 10A to 14B. For example, the above disclosure relating to the locations at which the cradle is mounted in the vehicle, the mounting mechanisms, components, and approaches used to mount the cradle to a part of the vehicle such as the headrest 202, the electrical connections between the cradle and the vehicle's power source and/or audio/video system, the electrical connections between multiple cradles mounted in the vehicle, etc., is understood to be applicable to exemplary embodiments according to FIGS. 10A to 14B.

As shown in FIG. 10B, in an exemplary embodiment, the cradle 1001 may include a media player such as, for example, a DVD player 1002, disposed therein. The vehicle entertainment system may play media provided by the media player disposed in the cradle 1001, media received wirelessly by the vehicle entertainment unit 1000, media stored on a memory of the vehicle entertainment unit 1000, and/or media provided to the vehicle entertainment unit 1000 via one of the connection ports disposed thereon.

Figure 11A:
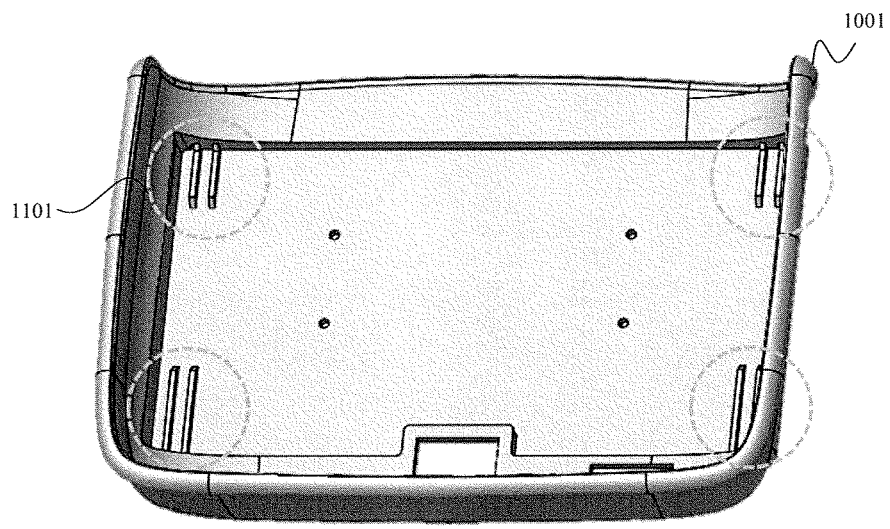
FIGS. 11A and 11B show a cradle of a vehicle entertainment system according to an exemplary embodiment of the present disclosure.
Figure 11B:
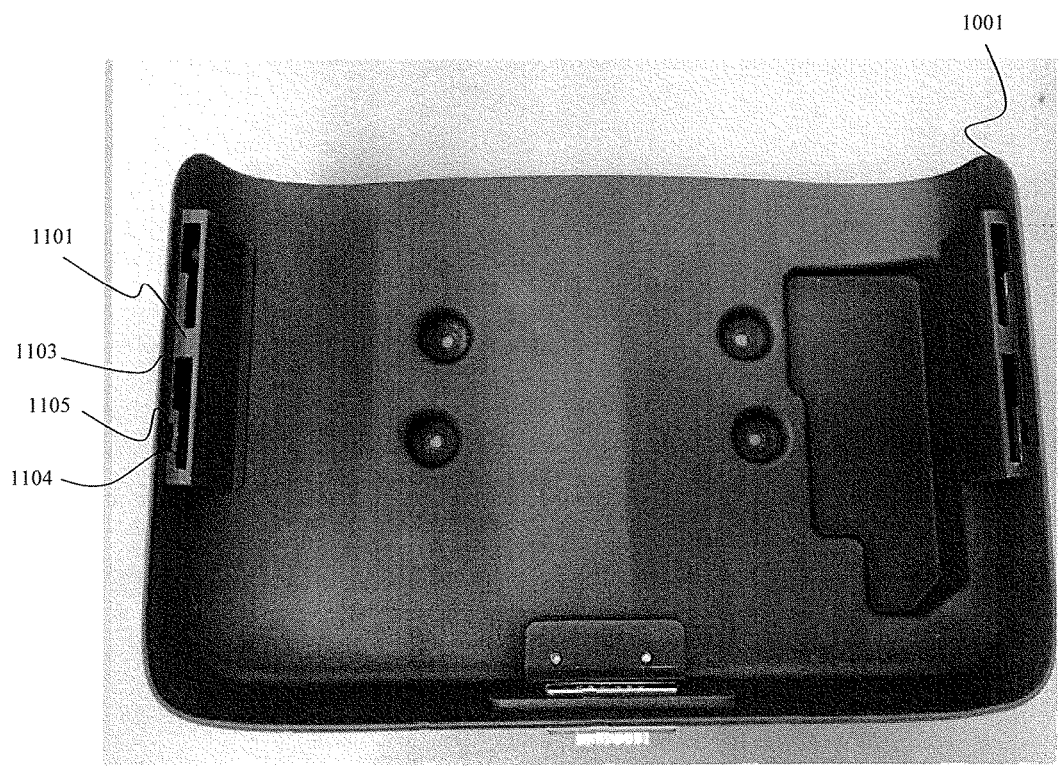
Figure 11C:
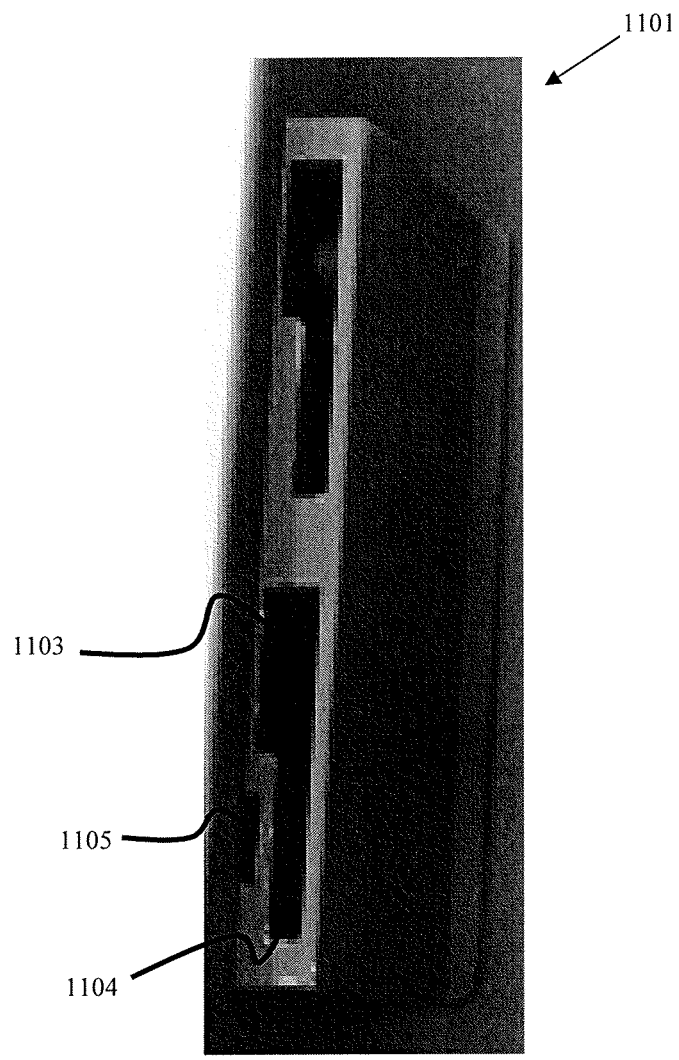
FIG. 11C is an enlarged view of a slot shown in FIGS. 11A and 11B according to an exemplary embodiment of the present disclosure.

FIGS. 11A and 11B show a cradle of a vehicle entertainment system according to an exemplary embodiment of the present disclosure. FIG. 11C is an enlarged view of a slot shown in FIGS. 11A and 11B according to an exemplary embodiment of the present disclosure.

Referring to FIGS. 11A to 11C, the cradle 1001 includes at least one slot 1101. Although FIGS. 11A and 11B show four slots 1101, each of which is circled in FIG. 11A, exemplary embodiments are not limited thereto. For convenience of explanation, an exemplary embodiment in which the cradle 1001 includes two slots 1101 will be described herein. However, exemplary embodiments are not limited thereto. For example, in exemplary embodiments, the cradle 1001 may include less than two slots 1101 or more than two slots 1101. It is further noted that although the slots 1101 shown in FIG. 11A do not illustrate the two portions 1103 and 1104 having different widths, as shown in FIG. 11B and as described further below, the slots 1101 in FIG. 11A may be embodied as the slots 1101 shown in FIG. 11B that include the two portions 1103 and 1104.

In an exemplary embodiment, the slots 1101 are disposed near opposing sides of the cradle 1001. For example, a first slot 1101 may be disposed near a first side (e.g., a left side) of the cradle 1001 and a second slot 1101 may be disposed near a second side (e.g., a right side) of the cradle 1001. The distance between the slots 1101 may vary, as exemplified by the different distance between the slots 1101 in FIG. 11A and in FIG. 11B. The slots 1101 are utilized with cooperating locking mechanisms of the vehicle entertainment unit 1000 to mount the vehicle entertainment unit 1000 in the cradle 1001, as described below.

Figures 12A, 12B, 12C, 12D:
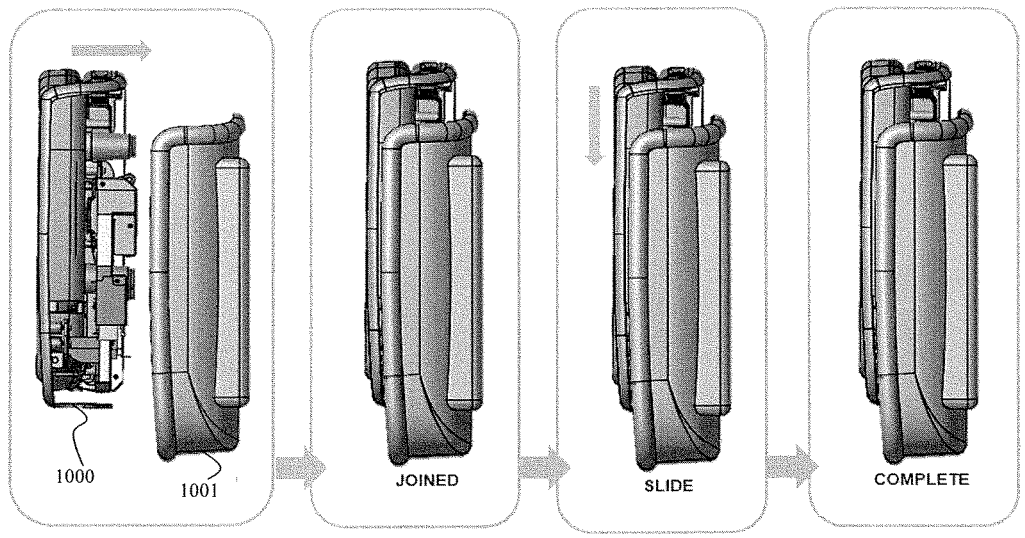
FIGS. 12A to 12D are side views showing a method of mounting (e.g., inserting and locking) a vehicle entertainment unit into a cradle according to an exemplary embodiment of the present disclosure.
Figures 13A, 13B, 13C, 13D:
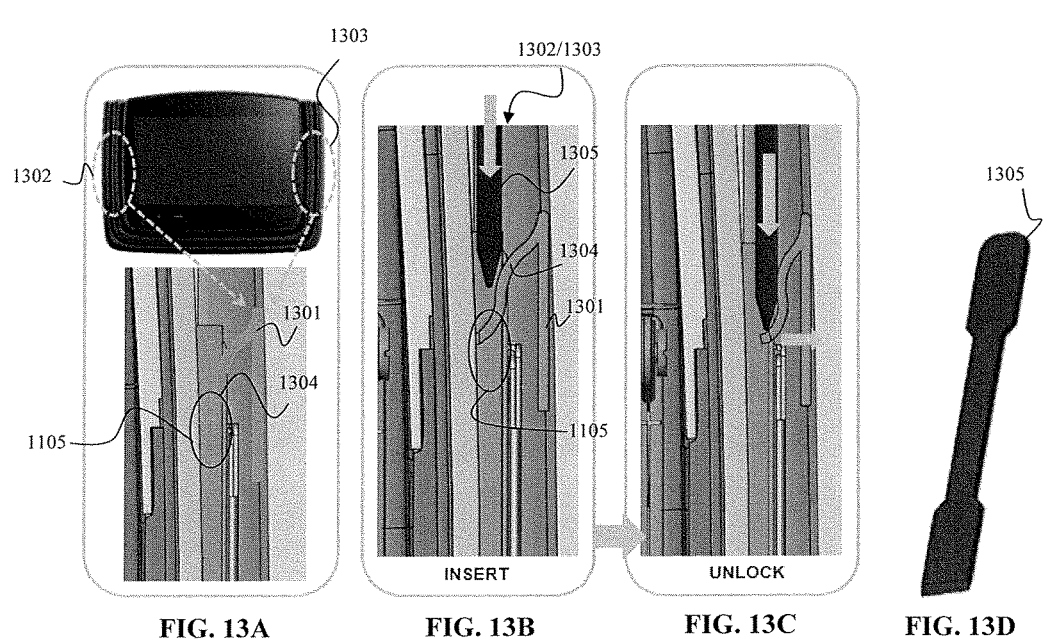
FIGS. 13A to 13C are side views showing a method of removing a vehicle entertainment unit from a cradle according to an exemplary embodiment of the present disclosure.
FIG. 13D shows a removal tool according to an exemplary embodiment of the present disclosure.

FIGS. 12A to 12D are side views showing a method of mounting (e.g., inserting and locking) a vehicle entertainment unit into a cradle according to an exemplary embodiment of the present disclosure. FIGS. 13A to 13C are side views showing a method of removing a vehicle entertainment unit from a cradle according to an exemplary embodiment of the present disclosure.

Referring to FIGS. 13A to 13C, the vehicle entertainment unit 1000 includes at least one locking mechanism 1301. The number of locking mechanisms 1301 disposed on the vehicle entertainment unit 1000 may vary, and corresponds to the number of slots 1101 disposed on the cradle 1001. The locking mechanisms 1301 are disposed near opposing sides of the vehicle entertainment unit 1000 such that they align with the slots 1101 of the cradle 1001 when the vehicle entertainment unit 1000 is mounted in the cradle 1001. The locking mechanisms 1301 may be disposed on a rear surface or may extend from a side surface of the vehicle entertainment unit 1000 such that when the vehicle entertainment unit 1000 is placed in the cradle, the locking mechanisms 1301 are matingly received into the slots 1101 on the cradle 1001.

Mounting the vehicle entertainment unit 1000 in the cradle 1001 includes placing the vehicle entertainment unit 1000 in the cradle 1001, and subsequently fixedly locking the vehicle entertainment unit 1000 in the cradle 1001, as described further below. The term "mounting" may also be generally used herein to refer to the process of removing the vehicle entertainment unit 1000 from the cradle 1001 after the vehicle entertainment unit 1000 has been fixedly locked in the cradle 1001.

Upon placing the vehicle entertainment unit 1000 in the cradle 1001, a first side (e.g., a left side) of the vehicle entertainment unit 1000 is adjacent to a first side (e.g., a left side) of the cradle 1001 and a second side (e.g., a right side) of the vehicle entertainment unit 1000 is adjacent to a second side (e.g., a right side) of the cradle 1001. The first side of the vehicle entertainment unit 1000 may contact the first side of the cradle 1001 except for an area in which a first space 1302 between the units that is used for removal of the vehicle entertainment unit 1000 from the cradle 1001 is disposed. The second side of the vehicle entertainment unit 1000 may contact the second side of the cradle 1001 except for an area in which a second space 1303 between the units that is used for removal of the vehicle entertainment unit 1000 from the cradle 1001 is disposed.

Upon placing the vehicle entertainment unit 1000 in the cradle 1001, a first locking mechanism 1301 near the first side of the vehicle entertainment unit 1000 is inserted into a first slot 1101 near the first side of the cradle 1001, and a second locking mechanism 1301 near the second side of the vehicle entertainment unit 1000 is inserted into a second slot 1101 near the second side of the cradle 1001 to fixedly lock the vehicle entertainment unit 1000 in the cradle 1001.

Herein, fixedly locking the vehicle entertainment unit 1000 in the cradle 1001 refers to locking the unit 1000 in the cradle 1001 such that the unit 1000 is stably supported within the cradle 1001 without moving within the cradle 1001, and such that the unit 1000 cannot be accidentally or unintentionally removed from the cradle 1001, for example, without the use of a removal tool by the user. The vehicle entertainment unit 1000 is fixedly mounted in the cradle 1001 as a result of fixedly locking the first and second locking mechanisms 1301 within the first and second slots 1101, respectively. Fixedly locking the locking mechanisms 1301 within the slots 1101 refers to inserting the locking mechanisms 1301 into the slots 1101 to engage the slots 1101 in a manner such that the locking mechanisms 1301 cannot be accidentally or unintentionally removed from the slots 1101, for example, without the use of a removal tool by the user.

According to exemplary embodiments, the locking mechanisms 1301 are fixedly locked within the slots 1101 by first placing the vehicle entertainment unit 1000 in the cradle, and subsequently sliding the vehicle entertainment unit 1000 in a first direction within the cradle. The first direction may be, for example, a downward direction, as shown in FIG. 12C.

In an exemplary embodiment, each of the slots 1101 includes a first portion 1103 having a first width and a second portion 1104 having a second width smaller than the first width, as shown in FIGS. 11B and 11C. In addition, each of the locking mechanisms 1301 includes a protruding member 1304 (see FIGS. 13A to 13C) that is inserted into the first portion 1103 of the corresponding slot 1101 upon placing the vehicle entertainment unit 1000 in the cradle 1001 and that is moved into the second portion 1104 of the corresponding slot 1101 to fixedly lock the vehicle entertainment unit 1000 in the cradle 1001. Herein, the protruding member 1304 may be generally referred to as the locking mechanism 1301 and vice versa.

When the vehicle entertainment unit 1000 is first placed into the cradle 1001, the locking mechanisms 1301 align with the corresponding slots 1101 such that the protruding member 1304 is inserted into the wider first portion 1103. While the protruding member 1304 is inserted into the wider first portion 1103, the vehicle entertainment unit 1000 is not yet fixedly locked within the cradle 1001. Upon sliding the vehicle entertainment unit 1000, for example, in a downward direction within the cradle 1001, as shown in FIG. 12C, the protruding member 1304 moves from the wider first portion 1103 to the narrower second portion 1104. As this occurs, the extension length of the locking mechanism 1301 first decreases as the protruding member 1304 is compressed, and then slightly increases, as the protruding member 1304 slightly decompresses and extends into a locking recess 1105 of the slot 1101, as can be seen in FIGS. 13A to 13C. When this occurs, the protruding member 1301 is fixedly locked within the slot 1101, thereby fixedly locking the vehicle entertainment unit 1000 in the cradle 1001. That is, when the locking mechanism 1301 is fixedly locked within the slot 1101, portions of the protruding member 1304 are disposed both within the narrower second portion 1104 and the locking recess 1105 of the slot 1101.

It is to be understood that the locking mechanisms 1301 and the slots 1101 are not limited to the embodiment described above in which the slots 1101 include two portions having different widths and a locking recess 1105, and in which the locking mechanisms 1301 include a protruding member 1304. Upon fixedly locking the vehicle entertainment unit 1000 in the cradle 1001, a first space 1302 aligned with the first locking mechanism 1301 is disposed between the first side of the cradle 1001 and the first side of the vehicle entertainment unit 1000, and a second space 1303 aligned with the second locking mechanism 1301 is disposed between the second side of the cradle 1001 and the second side of the vehicle entertainment unit 1000, as shown in FIG. 13A. The spaces 1302/1303 are designed to allow for the insertion of a removal tool 1305 (see FIG. 13D) therein. Since the spaces 1302/1303 are aligned with the locking mechanisms 1301, the removal tool 1305, which is shaped and dimensioned to be inserted into the spaces 1302/1303, makes contact with locking mechanisms 1301 in the slots 1101 when inserted and pushed into the spaces 1302/1303, thereby disengaging the locking mechanisms 1301 from the slots 1101. The vehicle entertainment unit 1000 is unlocked from the cradle 1001 upon inserting the removal tool 1305 into the spaces 1302/1303 to disengage the locking mechanisms 1301 from the slots 1101.

The removal tool 1305 according to an exemplary embodiment of the present disclosure is shown in FIG. 13D. The removal tool 1305 may be made of a variety of materials such as, for example, plastics, metals, etc., and may be made in a variety of sizes and shapes to correspond to the size of the spaces 1302/1303 and to correspond to the configuration of the locking mechanisms 1301 and the slots 1101.

The spaces 1302/1303 are exposed to the user on the front side of the vehicle entertainment unit 1000 and the cradle 1001 (e.g., on the same side as the display facing the viewer). Thus, referring to FIGS. 13B and 13C, it is to be understood that the top area in which the insertion tool 1305 is shown as being inserted into the spaces 1302/1303 corresponds to a user inserting the insertion tool 1305 into the spaces 1302/1303 via the front side of the vehicle entertainment unit 1000 and the cradle 1001.

When inserted through the spaces 1302/1303, the removal tool 1305 disengages the locking mechanisms 1301 from the slots 1101. For example, in an exemplary embodiment, as shown in FIGS. 13A to 13C, when inserted through the spaces 1302/1303, the removal tool 1305 contacts the protruding member 1304 of the locking mechanism 1301 to compress the locking mechanism 1301, allowing the protruding member 1304 to be pushed out of the locking recess 1105. Once out of the locking recess 1105, the locking member 1301 is permitted to move from the narrower portion 1104 of the slots 1101 to the wider portion 1103, thereby disengaging the locking mechanism 1301 from the slot 1101 upon sliding the vehicle entertainment unit 1000 out of the cradle 1001. That is, once the insertion tool 1305 has been inserted into the spaces 1302/1303, the vehicle entertainment unit 1000 may be slid in a second direction within the cradle opposite to the first direction (e.g., the unit 1000 may be slid in an upward direction) to disengage the locking mechanisms 1301 from the slots 1101. Thus, in an exemplary embodiment, the vehicle entertainment unit 1000 is understood to be fixedly locked within the cradle 1001 when the locking mechanisms 1301 are disposed within the narrower second portion 1104 and the locking recess 1105 of the slots 1101, and is understood to be placed within—but not fixedly locked within—the cradle 1001 when the locking mechanisms 1301 are disposed within the wider first portion 1103 of the slots 1101.

In an exemplary embodiment, a single removal tool 1305 may be utilized to separately disengage multiple locking mechanisms 1301 from multiple slots 1101. In this embodiment, all locking mechanisms 1301 may be separately disengaged (e.g., disengaged at different times) from their respective slots 1101 in a manner such that once the removal tool 1305 makes contact with a locking mechanism 1301 through the corresponding space 1302/1303, the locking mechanism 1301 remains disengaged until the vehicle entertainment unit 1000 is removed from the cradle 1001 by sliding the vehicle entertainment unit 100 out of the cradle 1001.

In an exemplary embodiment, two (or more) removal tools 1305 may be utilized to be inserted into multiple spaces 1302/1303 to disengage multiple locking mechanisms 1301 from multiple slots 1101 at substantially the same time. In this embodiment, each locking mechanism 1301 remains disengaged only while a removal tool 1305 is contacting it. Only upon disengagement of all locking mechanisms 1301 is the vehicle entertainment unit 1000 permitted to be removed from the cradle 1001 by sliding the vehicle entertainment unit 1000 out of the cradle 1001. This embodiment may provide additional stability by requiring that removal tools 1305 are contacting all engaged locking mechanism 1301 together to allow removal in order to prevent the accidental removal of the vehicle entertainment unit 1000 from the cradle 1001 upon the disengagement of less than all of the locking mechanisms 1301.

Figure 14A:
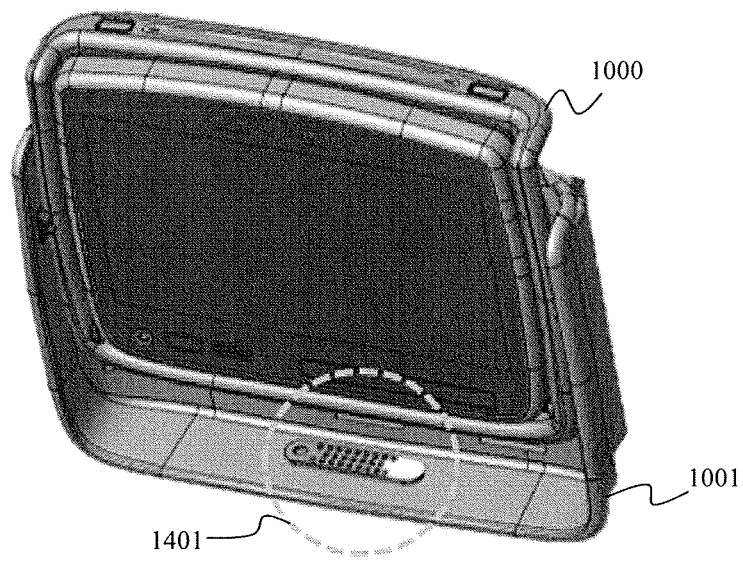
FIG. 14A is a top view of a vehicle entertainment system according to an exemplary embodiment of the present disclosure.
Figure 14B:
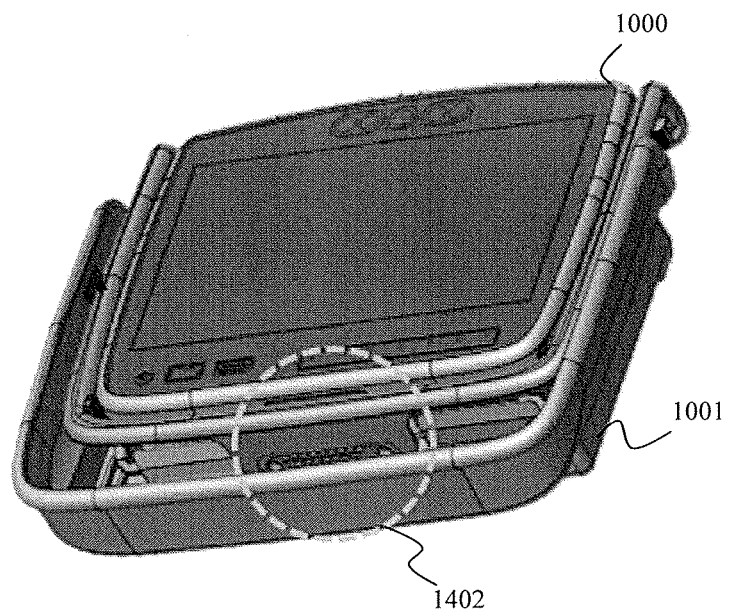
FIG. 14B is a bottom view of a vehicle entertainment system according to an exemplary embodiment of the present disclosure.

FIG. 14A is a top view of a vehicle entertainment system according to an exemplary embodiment of the present disclosure. FIG. 14B is a bottom view of a vehicle entertainment system according to an exemplary embodiment of the present disclosure.

As shown in FIGS. 14A and 14B, the cradle 1001 may include an electrical connection 1401 disposed thereon and the vehicle entertainment unit 1000 may include a cooperating electrical connection 1402 disposed thereon. Although FIGS. 14A and 14B show the electrical connections 1401/1402 disposed on bottom surfaces of the cradle 1001 and the vehicle entertainment unit 1000, the location of the electrical connections 1401/1402 is not limited thereto. The electrical connections 1401/1402 may utilize, for example, a pogo pin type connector, a D-sub type connector, etc. However, the electrical connections 1401/1402 are not limited thereto. For example, the electrical connections 1401/1402 may be implemented using the electrical connections 203/207 described above.

Exemplary embodiments of the present disclosure provide a secure way to mount a vehicle entertainment unit within a cradle which may be disposed in, for example, a vehicle headrest, as well as a convenient manner of removing the vehicle entertainment unit from the cradle when needed. For example, according to exemplary embodiments, a vehicle entertainment unit can only be removed from a cradle by inserting a removal tool(s) into spaces located between the vehicle entertainment unit and the cradle to disengage cooperating locking mechanisms and slots of the vehicle entertainment unit and cradle. As a result, a user can conveniently and securely mount a vehicle entertainment unit in a cradle in a vehicle while still having the ability to conveniently move, transfer and replace different vehicle entertainment units (e.g., units having different features) mounted in different cradles (e.g., in one or more cradles).

While the present disclosure has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A vehicle entertainment system, comprising:
a cradle disposed in a headrest of a vehicle, wherein the cradle comprises a first slot disposed near a first side of the cradle and a second slot disposed near a second side of the cradle, wherein the first and second sides of the cradle oppose each other;
a vehicle entertainment unit comprising a display, a first locking mechanism disposed near a first side of the vehicle entertainment unit, and a second locking mechanism disposed near a second side of the vehicle entertainment unit, wherein the first and second sides of the vehicle entertainment unit oppose each other,
wherein, upon placing the vehicle entertainment unit in the cradle, the first side of the vehicle entertainment unit is adjacent to the first side of the cradle and the second side of the vehicle entertainment unit is adjacent to the second side of the cradle,
wherein, upon placing the vehicle entertainment unit in the cradle, the first locking mechanism is inserted into the first slot and the second locking mechanism is inserted into the second slot to fixedly lock the vehicle entertainment unit in the cradle,
wherein, upon fixedly locking the vehicle entertainment unit in the cradle, a first space aligned with the first locking mechanism is disposed between the first side of the cradle and the first side of the vehicle entertainment unit and a second space aligned with the second locking mechanism is disposed between the second side of the cradle and the second side of the vehicle entertainment unit; and
a first removal tool shaped and dimensioned to be inserted into the first and second spaces to disengage the first and second locking mechanisms from the first and second slots,
wherein the vehicle entertainment unit is unlocked from the cradle upon inserting the first removal tool into the first space to disengage the first locking mechanism from the first slot and upon inserting the removal tool into the second space to disengage the second locking mechanism from the second slot.

2. The vehicle entertainment system of claim 1, wherein each of the first and second slots comprises a first portion having a first width and a second portion having a second width smaller than the first width,
wherein the first and second locking mechanisms each comprise a protruding member that is inserted into the first portion of the corresponding slot upon placing the vehicle entertainment unit in the cradle and that is inserted into the second portion of the corresponding slot upon fixedly locking the vehicle entertainment unit in the cradle.

3. The vehicle entertainment system of claim 1, wherein the first and second spaces are exposed on a front side of the vehicle entertainment unit and the cradle.

4. The vehicle entertainment system of claim 1, further comprising:
a second removal tool shaped and dimensioned to be inserted into the first and second spaces to disengage the first and second locking mechanisms from the first and second slots,
wherein the vehicle entertainment unit is unlocked from the cradle upon inserting one of the first and second removal tools into the first space to disengage the first locking mechanism from the first slot and upon inserting the other one of the first and second removal tools into the second space to disengage the second locking mechanism from the second slot at substantially a same time.

5. A vehicle entertainment system, comprising:
a cradle disposed in a headrest of a vehicle and comprising a first slot; and
a vehicle entertainment unit comprising a display and a first locking mechanism,
wherein, upon placing the vehicle entertainment unit in the cradle, the first locking mechanism is inserted into the first slot to fixedly lock the vehicle entertainment unit in the cradle,
wherein, upon fixedly locking the vehicle entertainment unit in the cradle, a first space aligned with the first locking mechanism is disposed between a first side of the cradle and a first side of the vehicle entertainment unit,
wherein the first space is shaped and dimensioned to receive a removal tool that contacts the first locking mechanism through the first space to disengage the first locking mechanism from the first slot.

6. The vehicle entertainment system of claim 5, wherein the first space is exposed on a front side of the vehicle entertainment unit and the cradle.

7. The vehicle entertainment system of claim 5,
wherein the first slot comprises a first portion having a first width and a second portion having a second width smaller than the first width,
wherein the first locking mechanism comprises a protruding member that is inserted into the first portion of the first slot upon placing the vehicle entertainment unit in the cradle and that is inserted into the second portion of the first slot upon fixedly locking the vehicle entertainment unit in the cradle.

8. The vehicle entertainment system of claim 5,
wherein the cradle further comprises a second slot and the vehicle entertainment unit further comprises a second locking mechanism,
wherein, upon placing the vehicle entertainment unit in the cradle, the second locking mechanism is inserted into the second slot to fixedly lock the vehicle entertainment unit in the cradle,
wherein, upon fixedly locking the vehicle entertainment unit in the cradle, a second space aligned with the second locking mechanism is disposed between a second side of the cradle and a second side of the vehicle entertainment unit,
wherein the second space is shaped and dimensioned to receive the removal tool that contacts the second locking mechanism through the second space to disengage the second locking mechanism from the second slot.

9. The vehicle entertainment system of claim 8, wherein the first and second spaces are exposed on a front side of the vehicle entertainment unit and the cradle.

10. The vehicle entertainment system of claim 5,
wherein the cradle further comprises a second slot and the vehicle entertainment unit further comprises a second locking mechanism,
wherein each of the first and second slots comprises a first portion having a first width and a second portion having a second width smaller than the first width,
wherein the first and second locking mechanisms each comprise a protruding member that is inserted into the first portion of the corresponding slot upon placing the vehicle entertainment unit in the cradle and that is inserted into the second portion of the corresponding slot upon fixedly locking the vehicle entertainment unit in the cradle.

11. A method of mounting a vehicle entertainment unit in a cradle, comprising:
placing the vehicle entertainment unit in the cradle,
wherein the cradle is disposed in a headrest of a vehicle, and the cradle comprises a first slot disposed near a first side of the cradle and a second slot disposed near a second side of the cradle, wherein the first and second sides of the cradle oppose each other,
wherein the vehicle entertainment unit comprises a display, a first locking mechanism disposed near a first side of the vehicle entertainment unit, and a second locking mechanism disposed near a second side of the vehicle entertainment unit, wherein the first and second sides of the vehicle entertainment unit oppose each other,
wherein, upon placing the vehicle entertainment unit in the cradle, the first side of the vehicle entertainment unit is adjacent to the first side of the cradle, the second side of the vehicle entertainment unit is adjacent to the second side of the cradle, the first locking mechanism is inserted into the first slot, and the second locking mechanism is inserted into the second slot; and
sliding the vehicle entertainment unit in a first direction within the cradle to fixedly lock the first locking mechanism within the first slot and the second locking mechanism within the second slot to fixedly lock the vehicle entertainment unit in the cradle,
wherein each of the first and second slots comprises a first portion having a first width and a second portion having a second width smaller than the first width,
wherein, upon placing the vehicle entertainment unit in the cradle, the first locking mechanism is inserted into the first portion of the first slot, and the second locking mechanism is inserted into the first portion of the second slot,
wherein, upon sliding the vehicle entertainment unit in the first direction within the cradle, the first locking mechanism is moved from the first portion of the first slot into the second portion of the first slot and the second locking mechanism is moved from the first portion of the second slot into the second portion of the second slot to fixedly lock the vehicle entertainment unit in the cradle.

12. The method of claim 11, further comprising:
inserting a removal tool into a first space aligned with the first locking mechanism and disposed between the first side of the cradle and the first side of the vehicle entertainment unit to move the first locking mechanism from the second portion of the first slot to the first portion of the first slot to disengage the first locking mechanism from the first slot;
inserting the removal tool into a second space aligned with the second locking mechanism and disposed between the second side of the cradle and the second side of the vehicle entertainment unit to move the second locking mechanism from the second portion of the second slot to the first portion of the second slot to disengage the second locking mechanism from the second slot; and
sliding the vehicle entertainment unit in a second direction opposite to the first direction to remove the vehicle entertainment unit from the cradle upon disengaging the first locking mechanism from the first slot and the second locking mechanism from the second slot.

13. The method of claim 11, further comprising:
inserting a first removal tool into a first space aligned with the first locking mechanism and disposed between the first side of the cradle and the first side of the vehicle entertainment unit to move the first locking mechanism from the second portion of the first slot to the first portion of the first slot to disengage the first locking mechanism from the first slot;
inserting a second removal tool into a second space aligned with the second locking mechanism and disposed between the second side of the cradle and the second side of the vehicle entertainment unit to move the second locking mechanism from the second portion of the second slot to the first portion of the second slot to disengage the second locking mechanism from the second slot,
wherein the first and second removal tools are inserted into the first and second spaces to disengage the first and second locking mechanisms from the first and second slots at substantially a same time; and
sliding the vehicle entertainment unit in a second direction opposite to the first direction to remove the vehicle entertainment unit from the cradle upon disengaging the first locking mechanism from the first slot and the second locking mechanism from the second slot.

14. A method of mounting a vehicle entertainment unit in a cradle, comprising:
  placing the vehicle entertainment unit in the cradle,
  wherein the cradle is disposed in a headrest of a vehicle, and the cradle comprises a first slot disposed near a first side of the cradle and a second slot disposed near a second side of the cradle, wherein the first and second sides of the cradle oppose each other,
  wherein the vehicle entertainment unit comprises a display, a first locking mechanism disposed near a first side of the vehicle entertainment unit, and a second locking mechanism disposed near a second side of the vehicle entertainment unit, wherein the first and second sides of the vehicle entertainment unit oppose each other,
  wherein, upon placing the vehicle entertainment unit in the cradle, the first side of the vehicle entertainment unit is adjacent to the first side of the cradle, the second side of the vehicle entertainment unit is adjacent to the second side of the cradle, the first locking mechanism is inserted into the first slot, and the second locking mechanism is inserted into the second slot;
  sliding the vehicle entertainment unit in a first direction within the cradle to fixedly lock the first locking mechanism within the first slot and the second locking mechanism within the second slot to fixedly lock the vehicle entertainment unit in the cradle;
  inserting a removal tool into a first space aligned with the first locking mechanism and disposed between the first side of the cradle and the first side of the vehicle entertainment unit to disengage the first locking mechanism from the first slot;
  inserting the removal tool into a second space aligned with the second locking mechanism and disposed between the second side of the cradle and the second side of the vehicle entertainment unit to disengage the second locking mechanism from the second slot; and
  sliding the vehicle entertainment unit in a second direction opposite to the first direction to remove the vehicle entertainment unit from the cradle upon disengaging the first locking mechanism from the first slot and the second locking mechanism from the second slot.

15. A method of mounting a vehicle entertainment unit in a cradle, comprising:
  placing the vehicle entertainment unit in the cradle,
  wherein the cradle is disposed in a headrest of a vehicle, and the cradle comprises a first slot disposed near a first side of the cradle and a second slot disposed near a second side of the cradle, wherein the first and second sides of the cradle oppose each other,
  wherein the vehicle entertainment unit comprises a display, a first locking mechanism disposed near a first side of the vehicle entertainment unit, and a second locking mechanism disposed near a second side of the vehicle entertainment unit, wherein the first and second sides of the vehicle entertainment unit oppose each other,
  wherein, upon placing the vehicle entertainment unit in the cradle, the first side of the vehicle entertainment unit is adjacent to the first side of the cradle, the second side of the vehicle entertainment unit is adjacent to the second side of the cradle, the first locking mechanism is inserted into the first slot, and the second locking mechanism is inserted into the second slot;
  sliding the vehicle entertainment unit in a first direction within the cradle to fixedly lock the first locking mechanism within the first slot and the second locking mechanism within the second slot to fixedly lock the vehicle entertainment unit in the cradle;
  inserting a first removal tool into a first space aligned with the first locking mechanism and disposed between the first side of the cradle and the first side of the vehicle entertainment unit to disengage the first locking mechanism from the first slot;
  inserting a second removal tool into a second space aligned with the second locking mechanism and disposed between the second side of the cradle and the second side of the vehicle entertainment unit to disengage the second locking mechanism from the second slot,
  wherein the first and second removal tools are inserted into the first and second spaces to disengage the first and second locking mechanisms from the first and second slots at substantially a same time; and
  sliding the vehicle entertainment unit in a second direction opposite to the first direction to remove the vehicle entertainment unit from the cradle upon disengaging the first locking mechanism from the first slot and the second locking mechanism from the second slot.

* * * * *